United States Patent
Crowl et al.

(10) Patent No.: US 11,636,246 B2
(45) Date of Patent: Apr. 25, 2023

(54) SYSTEMS AND METHODS FOR PREDICTING AND MANAGING POWER AND ENERGY USE OF SEMICONDUCTOR DEVICES

(71) Applicant: Innergy Systems, Inc, Santa Clara, CA (US)

(72) Inventors: Lawrence Crowl, Mountain View, CA (US); Ninad Huilgol, Fremont, CA (US)

(73) Assignee: INNERGY SYSTEMS, INC., Santa Clara, CA (US)

( * ) Notice: Subject to any disclaimer, the term of this patent is extended or adjusted under 35 U.S.C. 154(b) by 0 days.

(21) Appl. No.: 17/100,016

(22) Filed: Nov. 20, 2020

(65) Prior Publication Data
US 2021/0157966 A1 May 27, 2021

Related U.S. Application Data

(60) Provisional application No. 62/940,094, filed on Nov. 25, 2019.

(51) Int. Cl.
*G06F 30/367* (2020.01)
*G06F 30/327* (2020.01)
(Continued)

(52) U.S. Cl.
CPC .......... *G06F 30/367* (2020.01); *G06F 30/327* (2020.01); *G06F 30/337* (2020.01);
(Continued)

(58) Field of Classification Search
CPC .... G06F 30/327; G06F 30/367; G06F 30/337; G06F 30/373; G06F 30/3308; G06F 2119/06
See application file for complete search history.

(56) References Cited

U.S. PATENT DOCUMENTS 6,061,817 A * 5/2000 Jones ............... G01R 31/31813
708/250
6,598,209 B1 * 7/2003 Sokolov .................. G06F 30/33
716/109
(Continued)

OTHER PUBLICATIONS

Slides presented by the inventors at a Jun. 2018 Design Automation Conference in San Fransisco, CA.
(Continued)

*Primary Examiner* — Jack Chiang
*Assistant Examiner* — Aric Lin
(74) *Attorney, Agent, or Firm* — Stevens Law Group; David R. Stevens

(57) ABSTRACT

Methods for modifying power use of a semiconductor device include receiving, at one or more processors, an activity stream of a simulation of a semiconductor device, the activity stream comprising a stream of signals. Using the one or more processors, integrated circuit actions are recognized from the activity stream, each integrated circuit action representing an abstraction of work done by the semiconductor device. The processor(s) determine one or more values associated with the integrated circuit actions. A model of power use is generated for the semiconductor device, the model based at least in part on the recognized integrated circuit actions and the associated values. Based on an output of the model, power use of the semiconductor device is modified. Other methods and systems related to determining, modeling, and predicting power/energy use of semiconductor devices are also disclosed.

13 Claims, 17 Drawing Sheets

(51) Int. Cl.
    *G06F 30/337*    (2020.01)
    *G06F 30/373*    (2020.01)
    *G06F 30/3308*   (2020.01)
    *G06F 119/06*    (2020.01)
(52) U.S. Cl.
    CPC ........ *G06F 30/3308* (2020.01); *G06F 30/373* (2020.01); *G06F 2119/06* (2020.01)

(56) References Cited

U.S. PATENT DOCUMENTS

| | | | |
|---|---|---|---|
| 8,510,694 B2* | 8/2013 | Hsieh | G06F 30/33 716/109 |
| 9,141,736 B2 | 9/2015 | Huilgol | |
| 10,691,850 B1* | 6/2020 | Makovsky | G06F 7/026 |
| 2005/0204316 A1* | 9/2005 | Nebel | G06F 30/33 716/103 |
| 2007/0276645 A1* | 11/2007 | Veller | G06F 30/33 703/18 |

OTHER PUBLICATIONS

Additional slides presented by the inventors at a Jun. 2018 Design Automation Conference in San Francisco, CA.
Wikipedia entry for SPICE electronic circuit simulator, available online at least as early as Apr. 18, 2019, retrieved at http://web.archive.org/web/20190418134101/https://en.wikipedia.org/wiki/SPICE, last visited Nov. 12, 2020.
A description of additional disclosures made by the inventors at the Jun. 2018 Design Automation Conference in San Francisco, CA.

\* cited by examiner

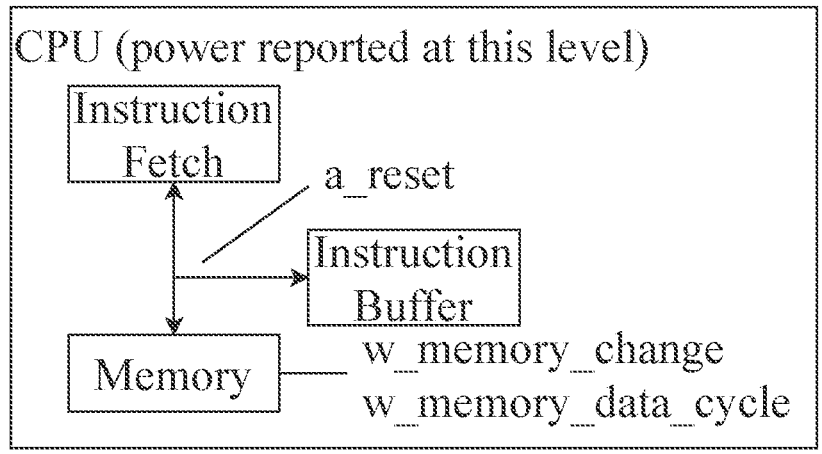

FIG. 7

```
module-machine,cpu
packet-type,fetch
packet-type,buffer
packet-type,memory
packet-type,wait
packet-type,compute
packet-type,other
state,fetching
state,waiting
state,buffering
state,memorying
state,computing
state,othering
transition,othering,othering,,none,
signal,a_reset,eq,1
transition,memorying,memorying,,none,
signal,w_mem_change,eq,1
signal,w_mem_data_cycle,eq,1
...
...
```

FIG. 8

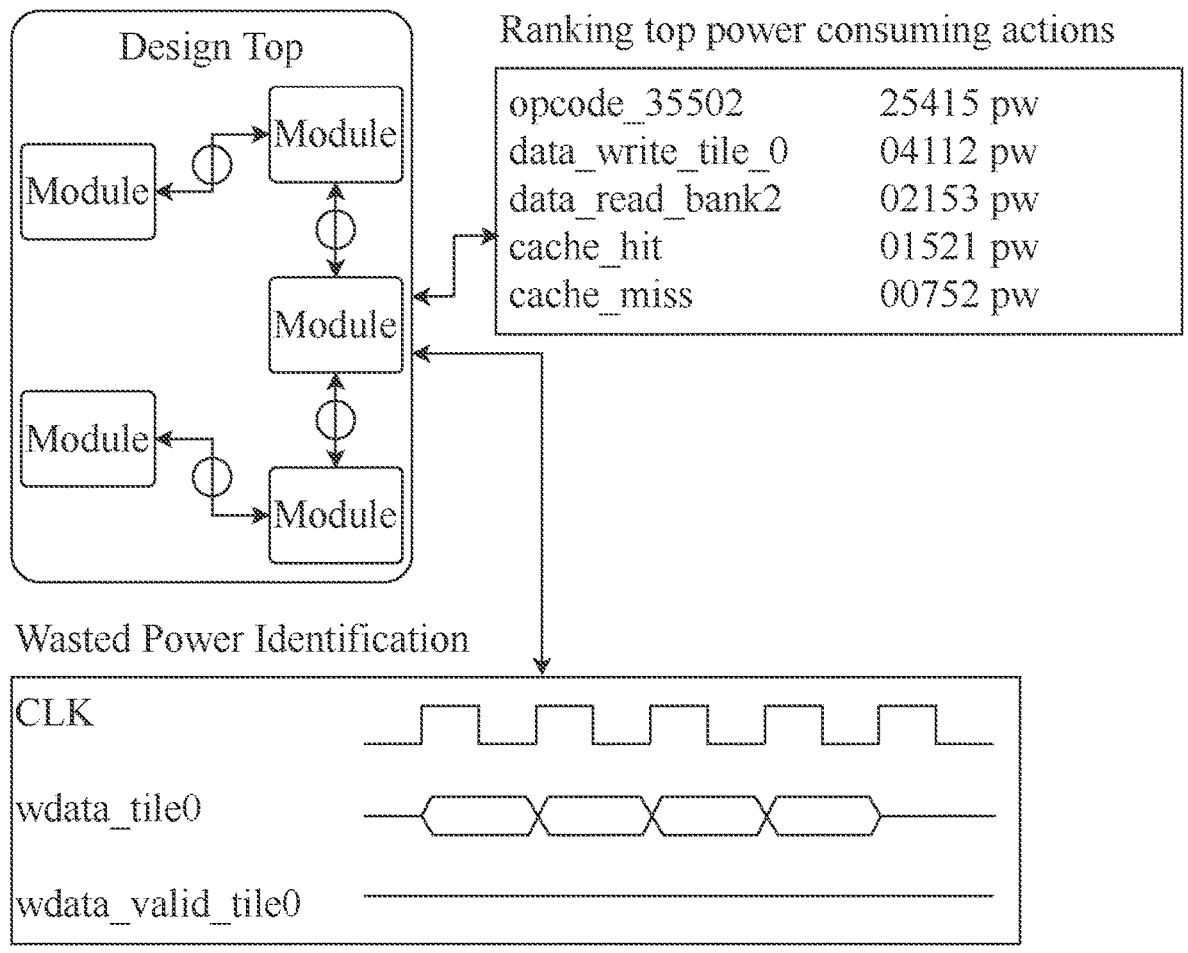
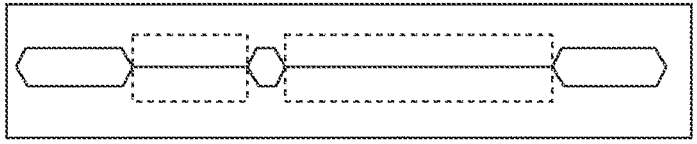
FIG. 11

System 100 Prediction Run

/usr/bin/time _v innergy2 predict design_top.ipp
Command being timed: "innergy2 predict design_top.ipp"
User time (seconds): 1730.91 (about 29 minutes)
System time (seconds): 0.17
Percent of CPU this job got: 99%
Elapsed (wall clock) time (h:mm:ss or m:ss): 0:29:30

Third Party Power Tool Run

User time: about 12-13 hours (overnight run)

| Test name | VCD size | PrimePower waveform (.out) size | Total sim duration | Modelling window |
|---|---|---|---|---|
| st_0 (Test T1) | 68 GB | 68 GB | 1408.847 us | 48 us |
| rand_stream_cache_0 (Test T2) | 5.6 GB | 5.6 GB | 107.053 us | 48 us |
| rand_tbl_rand_no_cache (Test T3) | 6.4 GB | 6.4 GB | 100.632 us | 48 us |
| rand_cache_0 (Test T4) | 6.4 GB | 6.4 GB | 100.632 us | 48 us |

FIG. 14

SYSTEMS AND METHODS FOR PREDICTING AND MANAGING POWER AND ENERGY USE OF SEMICONDUCTOR DEVICES

CROSS REFERENCE TO RELATED APPLICATIONS

This document claims the benefit of the filing date of U.S. Provisional Patent Application No. 62/940,094, entitled "Method for Building Action-based Models of Energy and Power in Semiconductor Designs," naming as inventors Lawrence Crowl and Ninad Huilgol, which was filed on Nov. 25, 2019, the disclosure of which is hereby incorporated entirely herein by reference.

BACKGROUND

1. Technical Field

Aspects of this document relate generally to predicting energy and power usage in semiconductor devices.

2. Background Art

Power is a strategic risk for semiconductor devices because product success may be directly tied to power. Reducing power can generally improve digital products which include semiconductor devices. Poor battery life can make a product undesirable in the market. A low-power product requires less cooling hardware, which reduces costs. High power peaks require costlier power supplies. High power peaks reduce can power supply reliability. High power density can risk thermal fracture.

Some methods exist in the art for predicting power and energy use of semiconductor devices. These are of limited help. They generally rely on analysis of transistor gate activity. This results in their being slow and having limiting analysis coverage. They generally do not help to identify root causes. They generally do not work with software simulators, and they do not help to explore different solutions through simulation.

SUMMARY

Implementations of methods for modifying power use of a semiconductor device may include: receiving, at one or more processors, a signal activity stream of a simulation of a semiconductor device, the signal activity stream including a stream of signals; and using the one or more processors: recognizing integrated circuit actions within the signal activity stream, wherein each integrated circuit action represents an abstraction of work done by the semiconductor device; wherein the processors recognize the integrated circuit actions based at least in part on the stream of signals; determining one or more values associated with the integrated circuit actions; generating a model of power use for the semiconductor device, the model based at least in part on the recognized integrated circuit actions and the associated values; and based on an output of the model, modifying power use of the semiconductor device.

Implementations of methods for modifying power use of a semiconductor device may include one or more or all of the following:

The one or more values may be obtained by the one or more processors directly from the stream of signals.

At least one value may be computed from one or more constants and the signals using logical and/or mathematical operations. The logical and/or mathematical operations may include: a hardware description language operation; a population count of one or more signals; and/or associating one value with another and using the association to recognize an integrated circuit action.

The step of recognizing integrated circuit actions may be performed by a formal automaton. The formal automaton may be: generated manually by one or more users; computed based on a circuit design specification of the semiconductor device; and/or computed using a list of signals.

The simulation of the semiconductor device may be a simulation that provides a trace of signal activity.

The step of recognizing integrated circuit actions may include using prior recognized integrated circuit actions from a prior stream of signals.

Implementations of methods for modeling energy use and/or power use of actions of a semiconductor device may include: receiving, at one or more processors, an output from a simulation of a semiconductor device; and using the one or more processors: recognizing, from the output, a plurality of integrated circuit actions; determining energy use and/or power use associated with each integrated circuit action; generating a first model energy use and/or power use for the semiconductor device, the first model based at least in part on the recognized integrated circuit actions and the determined energy use and/or power use associated with each integrated circuit action; generating a second model of energy use and/or power use for the semiconductor device, the second model based at least in part on the recognized integrated circuit actions and the determined energy use and/or power use associated with each integrated circuit action; and merging the first model and the second model to form a third model of energy use and/or power use for the semiconductor device.

Implementations of methods for modeling energy use and/or power use of actions of a semiconductor device may include one or more or all of the following:

The determined energy use and/or power use associated with each integrated circuit action may be determined based on: a manual user input; a computation performed by the one or more processors based at least in part on a design specification file associated with the semiconductor device; a measured energy use and/or power use over time from a simulation of the semiconductor device; a statistical prediction; and/or using machine learning.

The method may further include providing, using the one or more processors, one or more metrics to evaluate a quality of the first model, the second model, and/or the third model.

The one or more processors may generate the first model and the second model simultaneously based on a single stream of signals from the simulation of the semiconductor device.

The first model, the second model, and/or the third model may model an integrated circuit action as including multiple sub-actions, occurring at different points in time, each having an associated energy use and/or power use at the respective point in time.

Implementations of methods for predicting energy use and/or power use of actions of a semiconductor device may include: receiving, at one or more processors, an action stream associated with a semiconductor device, the action stream including a stream of integrated circuit actions, wherein each integrated circuit action represents an abstraction of work done by the semiconductor device, and wherein the stream of integrated circuit actions represents multiple consecutive integrated circuit actions with no gaps between them; generating, using the one or more processors, one or more models of power use and/or energy use for the semiconductor device, the one or more models based at least in part on the stream of integrated circuit actions; and using the one or more models and the one or more processors: determining power use and/or energy use for each integrated circuit action in the action stream; and predicting energy use and/or power use of the semiconductor device.

Implementations of methods for predicting energy use and/or power use of actions of a semiconductor device may include one or more or all of the following:

The action stream may be at least partially recognized from signal activity of a logic-level simulation of the semiconductor device, wherein the logic-level simulation includes a hardware description language (HDL) simulation, a transistor gate level simulation, and/or an integrated circuit emulator simulation. The act of recognizing the action stream, using the one or more processors, from the signal activity of a logic-level simulation, may be the act of the one or more processors "receiving" the action stream.

The one or more models may use fewer logic signals than present in the entire semiconductor device, or fewer logic signals than present in the logic-level simulation of the semiconductor device, to predict energy use and/or power use of the semiconductor device.

The action stream may be at least partially generated by a software simulation without reference to actual logic signals of the semiconductor device and without reference to simulated logic signals of the semiconductor device.

The action stream may be at least partially randomly generated.

The stream of integrated circuit actions may be modified before predicting energy use and/or power use of the semiconductor device.

The method may include modifying a determined power use and/or energy use for an integrated circuit action before predicting energy use and/or power use of the semiconductor device.

The method may include optimizing the semiconductor device for power consumption using automated software modification of the stream of integrated circuit actions.

All of the method steps may be performed in the same semiconductor device that is the basis of the simulation. The method may further include modifying power use and/or energy use of the semiconductor device based at least in part on predicting power use and/or energy use of the semiconductor device.

General details of the above-described implementations, and other implementations, are given below in the DESCRIPTION, the DRAWINGS, and the CLAIMS.

BRIEF DESCRIPTION OF THE DRAWINGS

Implementations will be discussed hereafter using reference to the included drawings, briefly described below, wherein like designations refer to like elements. The drawings are not necessarily drawn to scale.

FIG. 7 representatively illustrates method and system elements for predicting and managing power and energy use in semiconductor devices;

FIG. 8 representatively illustrates an example of an action description file;

FIG. 11 representatively illustrates method and system elements for predicting and managing power and energy use in semiconductor devices;

FIG. 14 representatively illustrates outcomes of a test of a system for predicting and managing power and energy use in semiconductor devices;

DESCRIPTION

Figure 1:
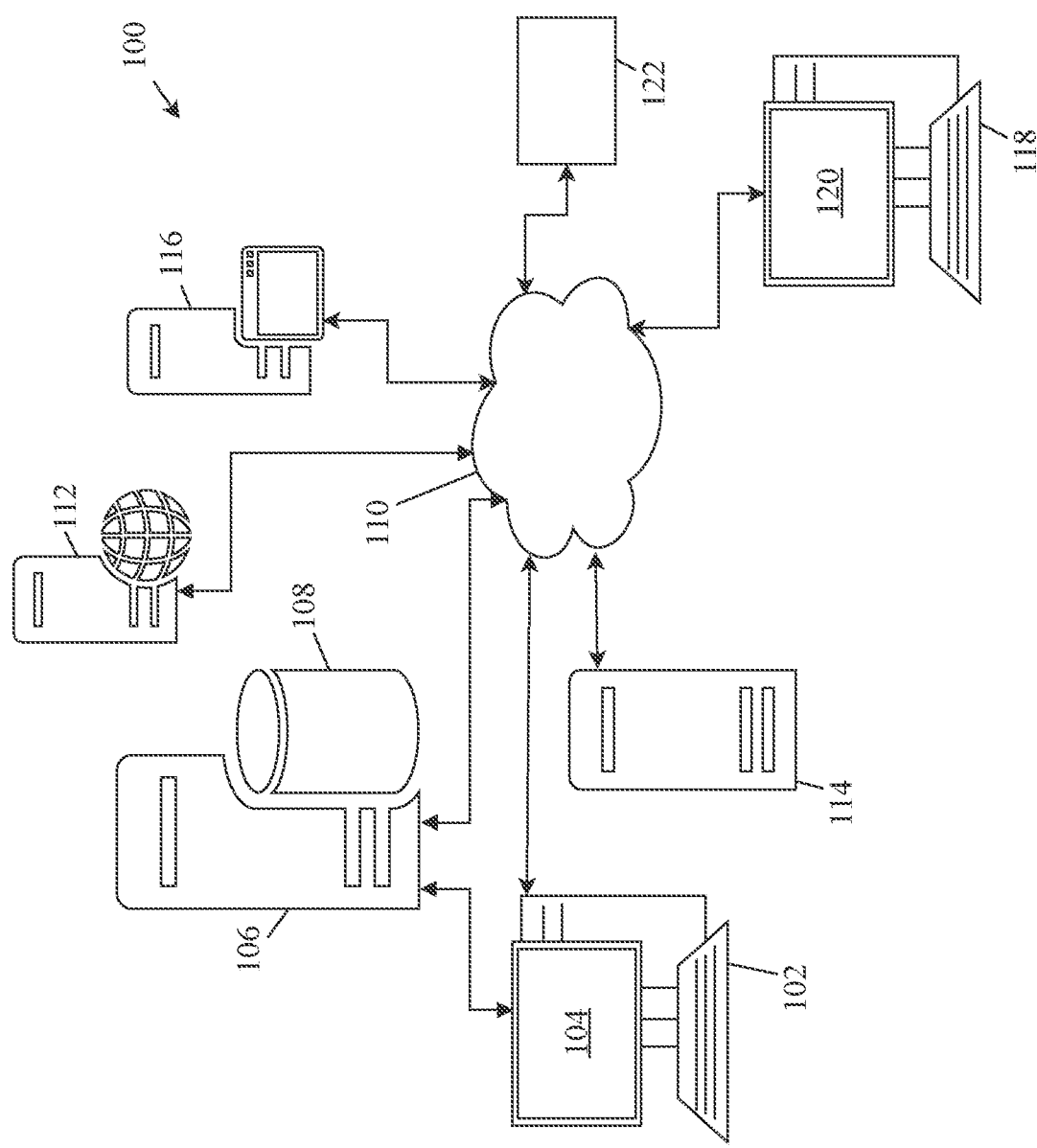
FIG. 1 representatively illustrates an example system for predicting and managing power and energy use of semiconductor devices.

Implementations/embodiments disclosed herein (including those not expressly discussed in detail) are not limited to the particular components or procedures described herein. Additional or alternative components, assembly procedures, and/or methods of use consistent with the intended systems and methods for predicting and managing power and energy use of semiconductor devices may be utilized in any implementation. This may include any materials, components, sub-components, methods, sub-methods, steps, and so forth.

As described to some extent above, there are some existing power models for transistors and other circuit elements. These are low-level power models for modeling power in the basic building blocks of any chip. There are usually billions of transistors and other circuit elements in a large chip. The SPICE software/language may be used to describe these models. Simulations with SPICE models can be extremely slow. A simulation for a simple operation could take weeks to finish, compared to a few minutes to a few hours if simulations are done at a higher abstraction, like with the power models disclosed herein. The methods herein are accordingly very different than SPICE modeling, which models transistor-level power.

There is a system power modeling standard IEEE 2416. This standard talks about modeling the low level elements of a chip in a similar manner to SPICE, but not with the SPICE software/language directly, but using another standard drafted by the IEEE 2416 committee. This standard asks that every element be modeled manually by the user, leading to a lot of effort when a large chip is involved. The power modeling systems and methods disclosed herein provide a simple method that asks users to describe actions and then associates them with power.

There are existing coarse grained (and simple) power state models. These operate at a simpler and coarser grain than the power models disclosed herein. For example, in a complex chip, a CPU might be thought of as operating in basic, simple power states, that might be termed as high activity, medium activity, light activity, and idle. A very simple model could be used consisting of just 4 states as mentioned. Simple models such as this are used to handle power management policy for a chip. The power models disclosed herein, however, operate with many more states, and at a much finer grain of states comprising all the different actions in the chip. This leads to a much more accurate and finer grained power analysis without compromising speed or accuracy.

Aspects of methods, systems, devices, components, and the like disclosed in this application may include any details/features disclosed in U.S. Pat. No. 9,141,736, issued Sep. 22, 2015, naming as first inventor Ninad Huilgol, the disclosure of which is incorporated entirely herein by reference.

Aspects of methods, systems, devices, components, and the like disclosed in this application may include any details/features disclosed in U.S. Pat. Pub. No. 2016/0042113 A1, published Feb. 11, 2016, naming as first inventor Ninad Huilgol, the disclosure of which is incorporated entirely herein by reference.

Implementations of systems and methods disclosed herein may be implemented using computer hardware and/or software. Any module disclosed in the drawings and/or discussed herein may be implemented using hardware (such as one or more processors) and/or using software (such as code running on one or more processors). Computer memory of any type may be used in implementing the methods and systems/apparatuses. Software/code for carrying out the methods disclosed herein may be written in any programming language or combination thereof.

By non-limiting example, FIG. 1 is a representative example of a system 100 which could be used to implement some of the methods disclosed herein. System 100 includes an administrator computing device 102 having a display 104. Device 102 is communicatively coupled with one or more data servers (or database servers) 106 which are themselves coupled with one or more data stores or databases 108. The communicative coupling could be direct, or indirect such as through a telecommunications network 110 (for example the Internet). The administrative device may further be communicatively coupled with one or more servers 114, one or more web servers 112, and one or more application servers 116. One or more end user computing devices 118, having displays 120, may be coupled with other system elements directly or through network 110. One or more semiconductor devices 122 may be communicatively coupled with other system elements directly or through network 110.

System 100 is only one representative example among many that could be given. In this example an administrator may use the administrative computing device 102 to configure various settings of the system such as setting up communicative connections, configuring user interfaces or reports, and the like. Data needing to be stored may be stored in the data stores or databases 108 and/or accessed therefrom using servers 106. Web servers 112 may be used to provide access to the system and methods through a website. Application servers 116 may be used to provide access to the system and methods through a software application. The end user computing device 118 may be used by an end user to access user interfaces, reports, and so forth to utilize the methods. The ability to couple a semiconductor device with system 100 may be useful for testing. Servers 114 may be used for processing or the like.

As stated, system 100 is just one representative example. In implementations many of the methods disclosed herein could be done in-situ within the semiconductor device 122, which may be an integrated circuit (IC), and may not require any administrative computing devices, end user computing devices, servers, data servers, web servers, application servers, or network 110, or the like, to be coupled with the semiconductor device. In implementations in which an end user accesses aspects of the system/methods through an end user computing device, or in which an administrator accesses aspects of the system/methods through an administrative computing device, any type of computing device could be used. FIG. 1 displays desktop computers, for example, but either of these could be a laptop, tablet, mobile phone, or any other type of computing device or interface device.

Figure 19:
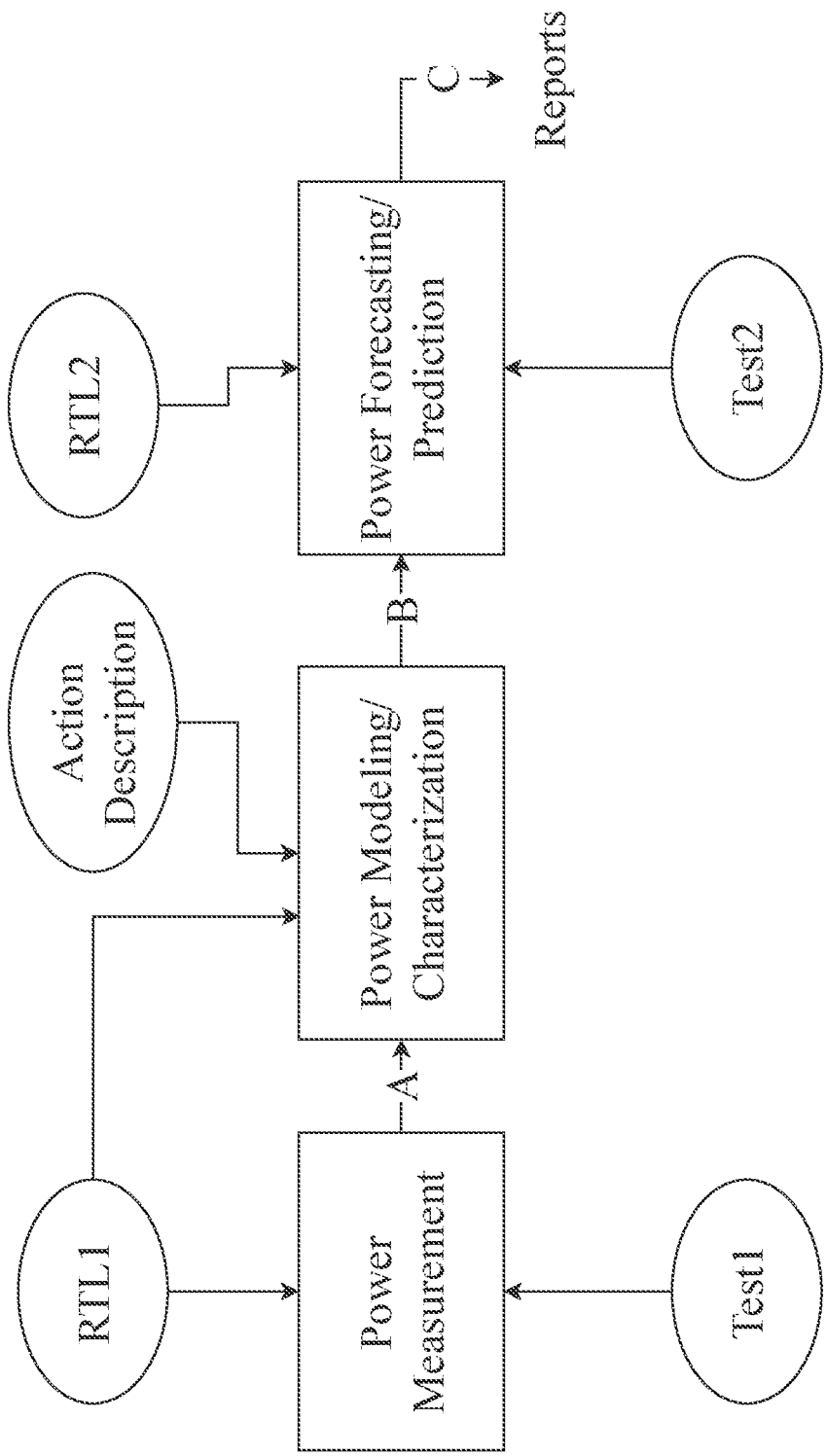
FIG. 19 representatively illustrates method and system elements for predicting and managing power and energy use in semiconductor devices.

FIG. 19 representatively illustrates example elements of implementations of power/energy model methods, and will be discussed in greater detail below. The system may be used for modeling of power in semiconductor devices based on "actions." Power and energy modeling based on "actions" is an effective method for reducing power and risk. It provides insight into hardware and software behavior and provides fast power prediction and "what-if" analysis. In implementations, action-power modeling relies on cycle-by-cycle power measurement, such as that provided by several existing tools. Action-power modeling may include building models (modeling) based on actual measured power or simulated power, and may also include predicting power using those models (forecasting), such as through simulations.

Actions

As used herein, the terms "action/actions" refer to abstractions of work. Actions may include, or may be, a continuous sequence of cycles on a single circuit module instance that performs a meaningful unit of work. In hardware, control signals may identify the type of work being done, and that type of work may be the abstraction. Prior U.S. Pat. No. 9,141,736, issued Sep. 22, 2015, naming as first inventor Ninad Huilgol, described using "Transaction Level Modeling (or TLM)" to model the behavior of semiconductor designs. In this application the term "action" is used instead of "transaction" to avoid any implication of that queries and responses are separated in space and time. Such separation dramatically increases modeling costs and fragility. Thus, the use of the word "continuous" above has significance. Actions can comprise many different things: communicating (as above) with parts of the design; calculating the result of a complex compilation inside the CPU; looking up a table, etc. Actions may include everything that can happen functionally inside a chip design.

It may also be said that an action occurs all at once, while a transaction may be a sequence of coordinated actions. The systems and methods herein model actions.

In implementations any modeled design module will have a continuous sequence of actions, each of which may be associated with a single interval of time. This approach enables assigning power for the entire simulation, which prevents gaps through which power may be unreported.

Multiple circuit module instances may be acting simultaneously. Furthermore, a single instance may have more than one action occurring simultaneously, which enables modeling independent interfaces, such as read and write memory ports.

In implementations it may be useful if the actions are familiar. Some example actions can be: a central processing unit (CPU) instruction execution; a memory transfer; a call to a software subroutine; and an idle period. These are only examples, and there are many other examples of "actions" that could be given.

While it may be useful for the actions to be familiar, in implementations it is possible to predict power successfully when actions correspond to the amount of signal activity associated with the actions. This approach may provide earlier predictive results but may do so without some feedback that could be meaningful to the designer.

Actions may be discriminated by associated values, which enables capturing data-driven control, such as CPU instruction operation code. When an ADF is written, it may be written with named values. The values may not affect a formal automaton, but they may affect power model building.

Recognition

In implementations the actions may be recognized from control signals by one or more formal automata. The formal automata may comprise a set of states and rules for how to transition between those states based on some inputs. The formal automata may have working storage. In implementations the output of the automata are actions, values and other associated information.

Automata may be manually specified, allowing the designer's knowledge and deeper insight into power to inform matches between control signals and actions. Alternatively, automata may be computed from the semiconductor device design specification, which may require less design knowledge, may provide an early analysis, and may often be sufficient for predicting software power consumption. One representative example of a formal automaton is a finite state machine.

As indicated above, each action may be discriminated by one or more values. This is to say that there may be one or more values associated with the action. The values could be in any format, such as binary, hexadecimal, alphanumeric, and so forth. An action's associated value(s) may be extracted directly from the signals or may be computed from them. As a very basic example, if an action is associated with two first signals being off and two other signals being on, a value associated with the action may be (0011). This is only one very basic example, and values may have any number of characters, may include numbers other than 0 and 1, may include alphanumeric characters, may include non-alphanumeric characters such as 'unknown' or 'high impedance,' and so forth. One very basic example of computing a value from signals could be taking the above example (0011) value and computing a value of (AABB), or converting a binary value to a hexadecimal value, and so forth. These are just basic examples, and many others could be given. The values may be saved to, and restored from, an associative data structure.

In implementations, the one or more formal automata take the time-varying signal file from a simulation as input. It may also provide a time-varying action/value file as output. The formal automaton in implementations will directly or indirectly specify the following items: a list of actions that may be recognized; a list of states within the formal automaton; a list of transitions from one state to another within the automaton; the condition for selecting a transition based on an expression over the current values; the current action that the automaton detects; and any associated value based on an expression over the signals. The latter two items, in implementations, constitute or are comprised in the output. The phrase "an expression over" as used herein represents performing a computation from one or more constants and the signal values using one of logical and mathematical operations.

The below formal-automata text file example shows a low-level description of a formal automaton for an "accumulator" module:
module-machine, accumulator
action-type,reset
action-type,change
action-type,idle
state,resetting
state,changing
state,idling
transition,resetting,resetting,none,
signal,a_reset,eq,1
transition,resetting,reset,none,
signal,a_reset,eq,1
transition,changing,changing,none,
signal,c_acc_change,eq,1
transition,changing,change,none,
signal,c_acc_change,eq,1
transition,idling,idling,none,
transition,idling,idle,none, The "module-machine" line gives the register transfer level (RTL) module name for the automaton. The "action-type" lines list possible action types. The "state" lines list the automaton states. The "transition" lines provide much of the information to transition between the states. The second field of each transition line gives the destination state. The third field of each transition line gives the originating state, where an empty field indicates any originating state is acceptable. The fourth field of each transition line gives the name of the action-type that this transition starts. In this example all actions end with the start of the next action. The fifth field of each transition line gives the change in the associated value, where "none" indicates no change, "zero" indicates setting the value to zero, "count" indicates incrementally increasing the value, and "capture" indicates replacing the value with the value of the expression in the sixth field. The "signal" lines provide enabling conditions on the "transition" lines immediately above them. The second field of each transition line gives an expression based in part on a signal value at the time of recognition. The third field of each transition line gives a comparison operator. The fourth field of each transition line gives an expression to compare with. All "signal" conditions following a "transition" line must be true to enable the transition."

The below formal-automata text file example shows a low-level description of a formal automaton for a "cpu" module, and is only given as another example:

```
module-machine,cpu
packet-type,fetch
packet-type,wait
packet-type,buffer
packet-type,memory
packet-type,wait
packet-type,compute
packet-type,other
state,fetching
state,waiting
state,buffering
state,memorying
state,waiting
state,computing
state,othering
transition,othering,othering,none,
signal,a_reset,eq,1
transition,othering,other,none,
signal,a_reset,eq,1
transition,memorying,memorying,none,
signal,w_mem_change,eq,1
signal,w_mem_data_cycle,eq,1
transition,memorying,memory,capture,w_ibf_opcode
signal,w_mem_change,eq,1
signal,w_mem_data_cycle,eq,1
transition,fetching,fetching,none,
signal,w_mem_change,eq,1
transition,fetching,fetch,none,
signal,w_mem_change,eq,1
transition,buffering,buffering,none,
signal,w_ibf_change,eq,1
transition,buffering,buffer,none,
signal,w_ibf_change,eq,1
transition,computing,computing,none,
signal,w_acc_change,eq,1
transition,computing,compute,capture,w_ibf_opcode
signal,w_acc_change,eq,1
transition,waiting,waiting,none,
signal,w_mem_data_cycle,eq,0
transition,waiting,wait,none,
signal,w_mem_data_cycle,eq,0
transition,waiting,waiting,none,
signal,w_mem_data_cycle,eq,1
transition,waiting,wait,capture,w_ibf_opcode
signal,w_mem_data_cycle,eq,1
transition,othering,othering,none,
transition,othering,other,none,
```

The expressions over signals can include scalar operations provided by hardware description languages (HDLs), e.g., VERILOG (standardized as IEEE 1364). And-reduction and or-reduction over the bits of a multi-bit signal are particularly helpful in isolating extreme values. A population-count enables determining the number of functional blocks simultaneously active and enables determining the "density of ones" in arithmetic operations.

In implementations, the automata are specified relative to a "module" as opposed to an "instance," as the "module" is what circuit designers write while each "instance" is a replicated use of the "module." However, in implementations any concrete simulation has only instances. Accordingly, the system may convert the specification for a "module" into a specification for an "instance." This conversion may include mapping the signal names in the "module" into signal names within each specific instance.

Streams

A signal activity stream (or activity stream) is a stream of logic-level changes, such as that output by an RTL-level or gate-level simulation. An action stream is a stream of actions done by a circuit in operation, as recognized using the herein-disclosed systems and methods. Several actions may occur at the same time, and they may overlap. A representation of a stream of actions that is independent of the source(s) of the actions enables great diversity in sources. For example, one source of action stream could be a low-level simulation of the circuit. Another source could be a high-level simulation of the functional components of the circuit, such as an instruction set simulation. Furthermore, a representation of a stream of actions that is independent of the recognition mechanism enables great diversity in the production of those streams.

Specifically, in implementations an action stream means the same thing if it is recognized from signals of a logic-level simulation or produced directly from a high-level simulation. In comparison to current tools, simulation can be faster because either: the low-level simulation need only produce the limited set of logic signals needed for action recognition; or the high-level simulation need only generate actions and need not simulate logic.

The representation of actions within streams in implementations will include one or more of the following: the path to the instance being recognized; the name of the action recognized; the associated value of the action; the start time of the action; and the end time of the action or the duration of the action. When a clock signal is not regular, the representation may include some measure of the number of clock periods used during the given time interval. This additional information helps properly model dynamic power, which is usually associated with clock edges, versus static power, which is usually associated with physical time. For action streams output from forecasting (see below), the representation could also include measures of power.

Modeling

An action power model associates energy/power with each discriminated action type. There are several approaches to producing models: manual, e.g. from a datasheet; computed, i.e. by automated analysis of the circuit design specification; or characterized, i.e. by correlating actions with cycle-by-cycle power reports. It is pointed out here that the disclosed models are called "power model(s)" throughout, but this is a shorthand and is meant to include energy modeling and modeling of other items, as well as using other values than those disclosed herein to compute power and energy.

The characterization approach can use, for example, statistical methods or machine learning methods. In either case, this approach may require a set of training cases. The statistical methods can provide metrics to enable evaluation of the quality of the training. The statistical method enables merging independently characterized models into a single, more comprehensive model. The statistical method has certain key requirements. First, in implementations it must be incremental, computing a set of values (a model) that can produce the statistical values at any time. The primary reason for this requirement is that simulations are often very long and non-incremental algorithms are impractical. The incremental computation of moments, well known in the statistical community, meets this requirement. Second, in implementations it must provide a linear correlation so as to assign power to actions where the actions have varying length. Maintaining moments for both length and power, with an additional metric summing the correlation components, meets this requirement. Third, in implementations the statistical models must be mergeable. The primary reason for this requirement is that it may often be the case that no single existing test fully exercises all of the possible actions. Rather than writing additional tests, merging the models may provide complete characterization. Adding moments of the models, with suitable adjustment for the count of samples and degree of moments, meets this requirement.

The output of the characterization approach is both a model and a set of reports. These reports provide insight into hardware power behavior. TABLE 1 below shows a sample characterization report. In the sample characterization report one can find, among other things, actions with the highest active power (column three of the report) and actions with the highest overall power (column seven of the report). One can also find unused interface signal changes. One can find high idle power, which is a clock-gating opportunity. See column three for actions accumulator/change and accumulator/idle (lines one and two) showing an idle power close to the change power. Column four shows the standard deviation within the power. A high standard deviation implies that the action may not represent a coherent amount of work. Columns five and six show the confidence interval for the true mean given the reported mean in column three. In this embodiment, we use Student's t-distribution for small sample sizes. If the lower and upper bounds of the confidence interval are not near 100%, either the work is highly random or more data should be provided for an accurate model. Line three, accumulator/reset, shows a very poorly characterized action.

TABLE 1

SAMPLE CHARACTERIZATION REPORT

| count | active ns | active nW | std dev | conf intvl lower | conf intvl upper | overall nW | value | module/action path name |
|---|---|---|---|---|---|---|---|---|
| 61 | 2 | 136679 | 68% | 82% | 117% | 22717 | n/a | accumulator/change |
| 62 | 9 | 105778 | 31% | 91% | 108% | 87908 | n/a | accumulator/idle |
| 1 | 2 | 677430 | 0% | 0% | n/a | 1845 | n/a | accumulator/reset |
| 61 | 2 | 589817 | 14% | 96% | 103% | 98035 | n/a | cpu/buffer |
| 6 | 2 | 359382 | 0% | 99% | 99% | 5875 | 0 | cpu/compute |
| 20 | 2 | 547328 | 5% | 97% | 102% | 29827 | 2 | cpu/compute |
| 19 | 2 | 422574 | 0% | 99% | 100% | 21877 | 3 | cpu/compute |
| 8 | 2 | 718458 | 4% | 96% | 103% | 15661 | 4 | cpu/compute |
| 8 | 2 | 419140 | 0% | 99% | 100% | 9136 | 6 | cpu/compute |
| 61 | 2 | 538153 | 14% | 96% | 103% | 89447 | n/a | cpu/fetch |
| 6 | 2 | 492636 | 6% | 93% | 106% | 8054 | 0 | cpu/memory |
| 20 | 2 | 535984 | 3% | 98% | 101% | 29208 | 2 | cpu/memory |
| 19 | 2 | 204820 | 0% | 100% | 100% | 10603 | 3 | cpu/memory |
| 8 | 2 | 564147 | 3% | 96% | 103% | 12297 | 4 | cpu/memory |
| 8 | 2 | 455855 | 0% | 100% | 100% | 9936 | 6 | cpu/memory |
| 1 | 2 | 1608468 | 0% | 0% | n/a | 4382 | n/a | cpu/other |
| 6 | 2 | 167846 | 0% | 100% | 100% | 2744 | 0 | cpu/wait |
| 20 | 2 | 167846 | 0% | 100% | 100% | 9146 | 2 | cpu/wait |
| 19 | 2 | 104138 | 0% | 100% | 100% | 5391 | 3 | cpu/wait |
| 8 | 2 | 167846 | 0% | 100% | 100% | 3658 | 4 | cpu/wait |
| 8 | 2 | 167846 | 0% | 100% | 100% | 3658 | 6 | cpu/wait |
| 61 | 2 | 166277 | 0% | 100% | 100% | 27637 | n/a | cpu/wait |
| 61 | 2 | 164131 | 0% | 100% | 100% | 27280 | n/a | memory/fetch |
| 122 | 4 | 63570 | 18% | 96% | 103% | 42264 | n/a | memory/idle |
| 42 | 2 | 164528 | 1% | 99% | 100% | 18828 | n/a | memory/read |
| 1 | 2 | 253544 | 0% | 0% | n/a | 690 | n/a | memory/reset |
| 19 | 2 | 41789 | 0% | 100% | 100% | 2163 | n/a | memory/write |
| 288 | 8 | 15487 | 40% | 95% | 104% | 49713 | n/a | register/idle |
| 4 | 2 | 118222 | 43% | 31% | 168% | 1288 | n/a | register/reset |
| 286 | 2 | 96141 | 37% | 95% | 104% | 74922 | n/a | register/set |

One can also find top power consuming sub-instances during an action. TABLE 2, below, is a sample sub-instance characterization report.

TABLE 2

SAMPLE SUB-INSTANCE CHARACTERIZATION REPORT

| count | active ns | active nW | std dev | conf intvl lower | conf intvl upper | overall nW | value | module/ action path name | submodule path name |
|---|---|---|---|---|---|---|---|---|---|
| 61 | 2 | 136679 | 68% | 82% | 117% | 22717 | n/a | accumulator/ change | |
| 62 | 9 | 105778 | 31% | 91% | 108% | 87908 | n/a | accumulator/ idle | |
| 1 | 2 | 677430 | 0% | 0% | n/a | 1845 | n/a | accumulator/ reset | |

TABLE 2-continued

SAMPLE SUB-INSTANCE CHARACTERIZATION REPORT

| count | active ns | active nW | std dev | conf intvl lower | conf intvl upper | overall nW | value | module/ action path name | submodule path name |
|---|---|---|---|---|---|---|---|---|---|
| 61 | 2 | 6834 | 139% | 64% | 135% | 1136 | n/a | accumulator/ change | accumulator/ left filter |
| 62 | 9 | 7940 | 65% | 83% | 116% | 6599 | n/a | accumulator/ idle | accumulator/ left filter |
| 1 | 2 | 67589 | 0% | 0% | n/a | 184 | n/a | accumulator/ reset | accumulator/ left filter |
| 61 | 2 | 0 | n/a | 100% | 100% | 0 | n/a | accumulator/ change | accumulator/ right filter |
| 62 | 9 | 17297 | 30% | 92% | 107% | 14375 | n/a | accumulator/ idle | accumulator/ right filter |
| 1 | 2 | 67589 | 0% | 0% | n/a | 184 | n/a | accumulator/ reset | accumulator/ right filter |
| 61 | 2 | 10466 | 277% | 28% | 171% | 1739 | n/a | accumulator/ change | accumulator/ the acc add |
| 62 | 9 | 23050 | 55% | 85% | 114% | 19156 | n/a | accumulator/ idle | accumulator/ the acc add |
| 1 | 2 | 142472 | 0% | 0% | n/a | 388 | n/a | accumulator/ reset | accumulator/ the acc add |
| 61 | 2 | 97383 | 37% | 90% | 109% | 16186 | n/a | accumulator/ change | accumulator/ the acc reg |
| 62 | 9 | 17546 | 15% | 96% | 103% | 14582 | n/a | accumulator/ idle | accumulator/ the acc reg |
| 1 | 2 | 162067 | 0% | 0% | n/a | 441 | n/a | accumulator/ reset | accumulator/ the acc reg |

When characterizing there are two difficult, but doable, use cases. First, two concurrent actions that share circuitry require substantial test cases to determine the power for each action type. Second, when modeling an instance containing a pipeline, the energy of the pipeline stages must be properly assigned to actions.

Predictive Simulation (Forecasting)

Forecasting computes the power of an action stream. An action stream may be recognized from the signals of a logic-level simulation. An action stream may also be produced directly from a high-level simulation. Since the actions are provided whole, no signals are needed. The forecast provides reports similar to those provided by traditional power measurement tools, e.g., power for modules and power peaks. For example, TABLE 3 below shows an example prediction module report showing power for modules.

TABLE 3

Prediction Module Report

| overall nW | module name |
|---|---|
| 445920 | cpu |

TABLE 4 below shows an example prediction peak report showing power peaks.

TABLE 4

Prediction Peak Report

| peak nW | time ns | module name |
|---|---|---|
| 1649280 | 0 | cpu |
| 759275 | 66 | cpu |
| 630634 | 12 | cpu |
| 630634 | 24 | cpu |
| 630634 | 36 | cpu |
| 630634 | 48 | cpu |
| 588144 | 18 | cpu |
| 588144 | 53 | cpu |
| 578970 | 7 | cpu |
| 578970 | 31 | cpu |

In addition, the forecast may provide a report on the actions in the forecasted test, which enables evaluation of the relative use of actions between characterization and forecasting. This is seen for example in TABLE 5, which is a prediction action report.

TABLE 5

Prediction Action Report

| count | active ns | active nW | overall nW | value | module/action path name |
|---|---|---|---|---|---|
| 2049 | 2 | 589817 | 98294 | n/a | cpu/buffer |
| 258 | 2 | 359382 | 7541 | 0 | cpu/compute |
| 511 | 2 | 547328 | 22747 | 2 | cpu/compute |
| 512 | 2 | 718458 | 29918 | 4 | cpu/compute |
| 383 | 2 | 422574 | 13163 | 3 | cpu/compute |
| 385 | 2 | 419140 | 13124 | 6 | cpu/compute |
| 2049 | 2 | 538153 | 89684 | n/a | cpu/fetch |
| 258 | 2 | 492636 | 10337 | 0 | cpu/memory |
| 511 | 2 | 535984 | 22276 | 2 | cpu/memory |
| 512 | 2 | 564147 | 23492 | 4 | cpu/memory |
| 383 | 2 | 204820 | 6380 | 3 | cpu/memory |
| 385 | 2 | 455855 | 14274 | 6 | cpu/memory |
| 1 | 2 | 1608468 | 130 | n/a | cpu/other |
| 258 | 2 | 167846 | 3522 | 0 | cpu/wait |
| 511 | 2 | 167846 | 6975 | 2 | cpu/wait |
| 512 | 2 | 167846 | 6989 | 4 | cpu/wait |
| 383 | 2 | 104138 | 3243 | 3 | cpu/wait |

TABLE 5-continued

Prediction Action Report

| count | active ns | active nW | overall nW | module/action value | path name |
|---|---|---|---|---|---|
| 385 | 2 | 167846 | 5255 | 6 | cpu/wait |
| 2049 | 2 | 166277 | 27710 | n/a | cpu/wait |

When forecasting several instances at once, actions may be recognized out of time order. In implementations, to provide an accurate time-based power waveform the actions must be sorted on time order. In implementations this sorting must be incremental to avoid storing all the data or waiting for results. A priority sort provides incremental results with storage proportional to the number of distinct instances forecast.

Figure 2:
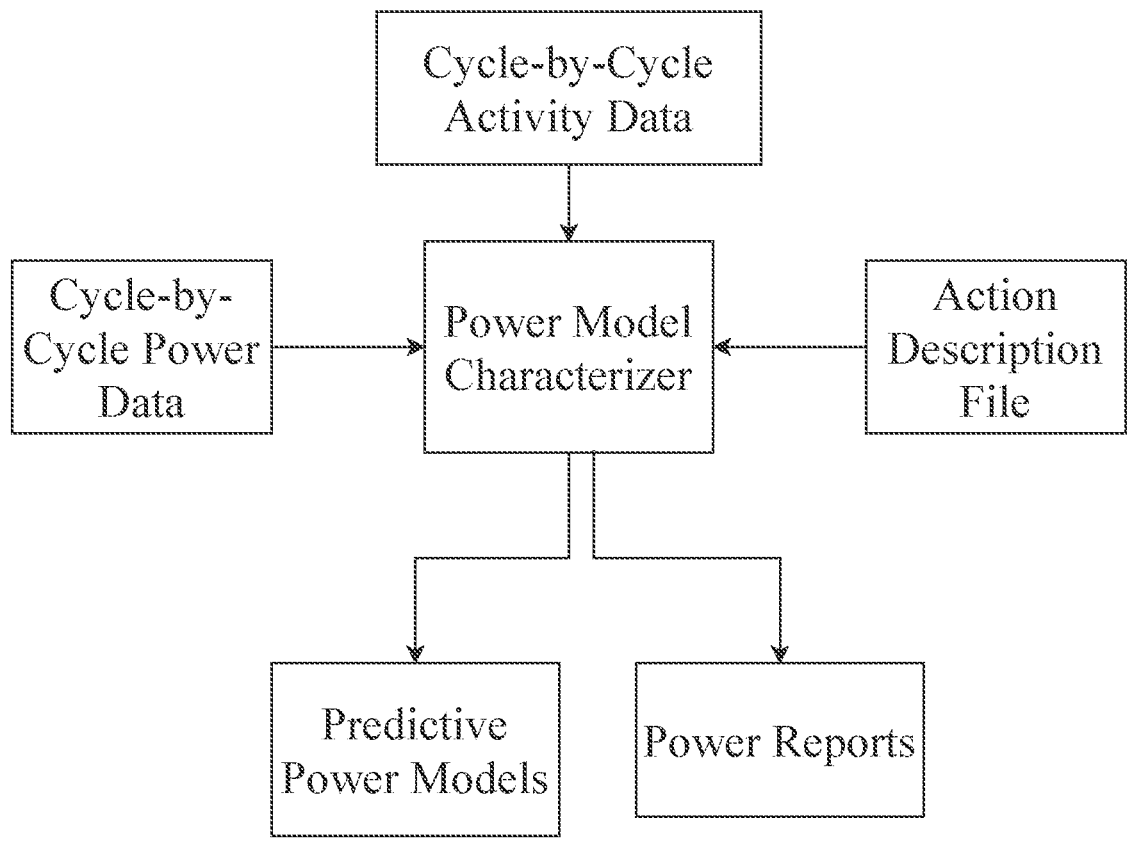
FIG. 2 representatively illustrates method and system elements for predicting and managing power and energy use in semiconductor devices.

FIG. 2 is a block diagram representatively illustrating a method for building power models. This process can be termed "Power Model Characterization."

1. Semiconductor Design Under Test (DUT) is subjected to stimulus which simulates the work done by the DUT.
2. Action Description File (ADF) contains the actions within the DUT. The ADF may just be a file indicating that certain signals are on and others are off, for example.
3. Power information is generated by running a third party power measurement tool. The Power Model Characterizer uses the output of step 1 described above (an activity profile representing the work done inside the DUT), the Action Description File (ADF), and the Power Information to build the predictive power models, and to provide power reports.

Figure 3A:
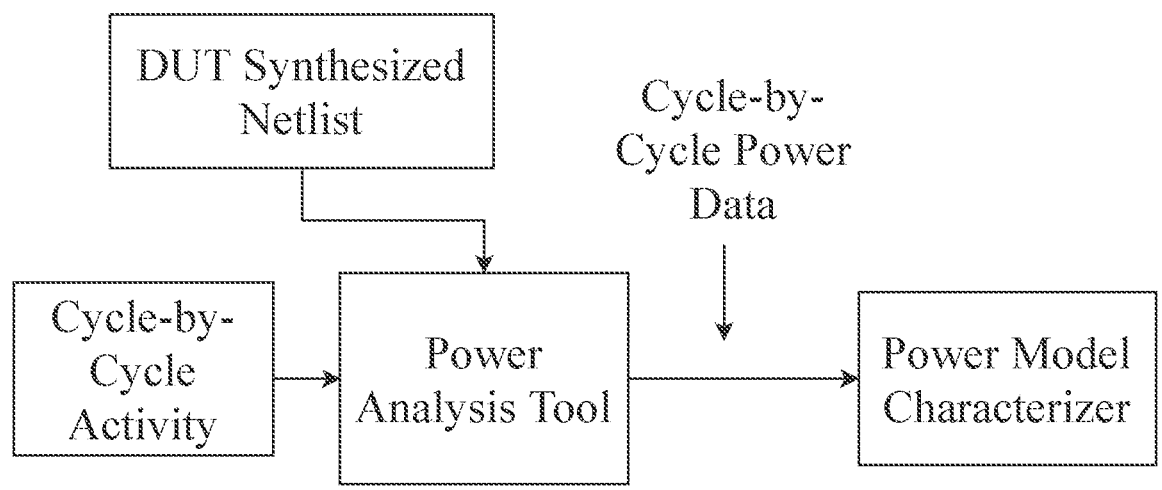
FIG. 3A representatively illustrates method and system elements for predicting and managing power and energy use in semiconductor devices.

FIG. 3A shows how the cycle by cycle power data can be created. In implementations the power analysis tool is any tool that can generate cycle-by-cycle power data for the DUT using cycle-by-cycle activity and the synthesized netlist of the DUT. In implementations the power analysis tool is a third party tool that the system 100 has access to, but which may not itself be part of system 100.

Figure 3B:
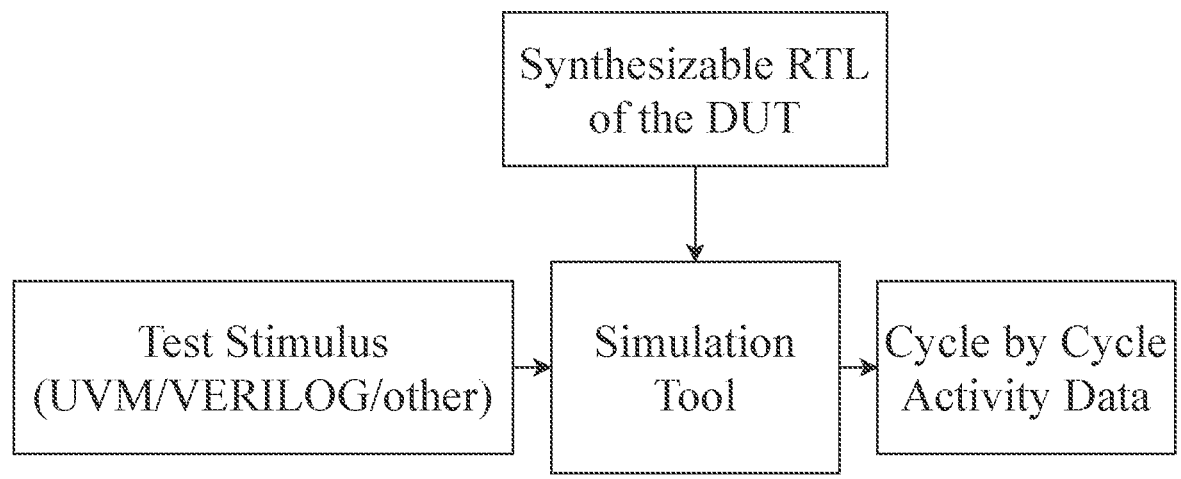
FIG. 3B representatively illustrates method and system elements for predicting and managing power and energy use in semiconductor devices.

FIG. 3B shows how cycle-by-cycle activity data can be generated using a simulation tool. Any simulation tool that can generate cycle-by-cycle activity data may be used. In implementations the simulation tool is a third party tool that the system 100 has access to, but which may not itself be part of system 100. The simulation tool uses synthesizable register transfer level (RTL) data of the design under test (DUT) and the test stimulus such as universal verification methodology (UVM), Verilog, SystemVerilog or some other test stimulus, and outputs the cycle by cycle activity data.

Figure 4A:
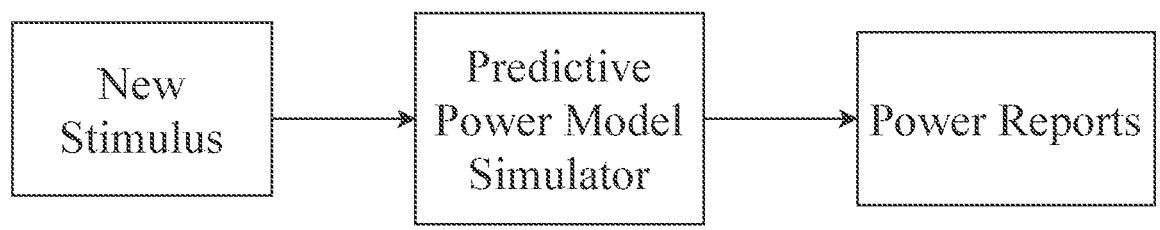
FIG. 4A representatively illustrates method and system elements for predicting and managing power and energy use in semiconductor devices.
Figure 4B:
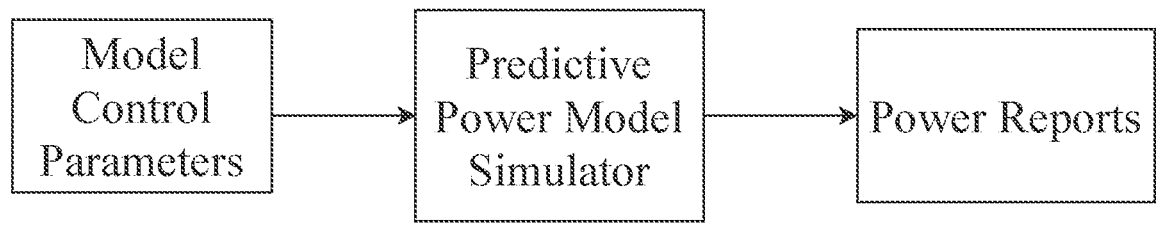
FIG. 4B representatively illustrates method and system elements for predicting and managing power and energy use in semiconductor devices.

FIGS. 4A and 4B show ways in which power models can be used. This process can be termed "Predictive Power Simulation."

1. The power model can be subjected to new stimulus in the form of new tests running on the DUT, or a software program running on the DUT.
2. The power model can be subjected to changing control parameters of the model and perform a self-contained power model simulation without requiring new stimulus.
3. The outputs of the Predictive Power Model Simulator are power reports, which can be in text form or graphical form to be used with a Graphical User Interface (GUI) tool.

The model-based power analysis systems and methods disclosed herein have several advantages over prior art methods of analyzing power of semiconductor devices. Current power modeling solutions are too slow to scale to large designs. As the design size increases, the speed of power analysis decreases. Additionally, while there are early solutions (such as RTL-based solutions) and later stage solutions (such as transistor gate-level solutions), there is no single tool in the prior art that provides both. While existing early stage solutions (such as RTL-based solutions) are quicker than gate-level solutions, they do not have as high accuracy as gate level solutions. Gate-level solutions, closer to tape-out, have higher accuracy than RTL-based solutions, but are more time consuming. The models and methods disclosed herein, on the other hand, run anywhere from twenty times to three hundred times faster than leading solutions, with better than ninety-five percent of typical accuracy. The solutions disclosed herein show power cost of actions, provide power vs. performance analysis, flag power deviations, and so forth. The accurate, comprehensive power models disclosed herein are portable to software environments. This is a capability unavailable in other semiconductor power analysis solutions.

Figure 5A:
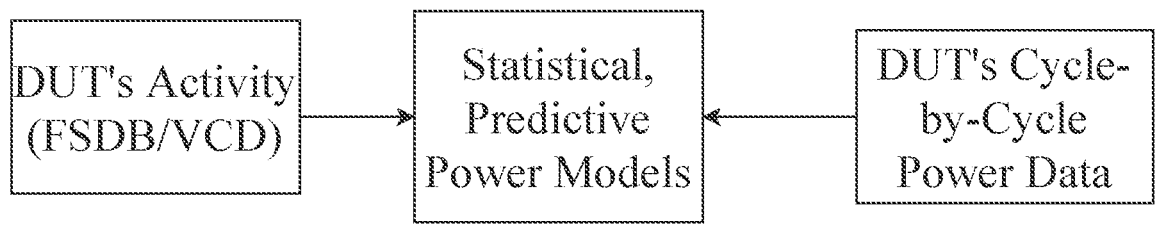
FIG. 5A representatively illustrates method and system elements for predicting and managing power and energy use in semiconductor devices.

FIG. 5A representatively illustrates the building of a power model. The cycle-by-cycle power data can be an in-house solution based on power measurement. The cycle-by-cycle power data can also be obtained using an existing tool such as SYNOPSYS PRIMEPOWER PT/PX. The DUT's activity is also used, such as obtained from a fast signal database (FSDB) or a value change dump (VCD) file. The power models are built and function by associating functional actions (DUT's activity such as memory transfers, CPU opcode executions, etc.) and cycle-by-cycle power to produce power estimations of actions. In implementations the power per action is the statistical mean of the power cost for that type of action.

Figure 5B:
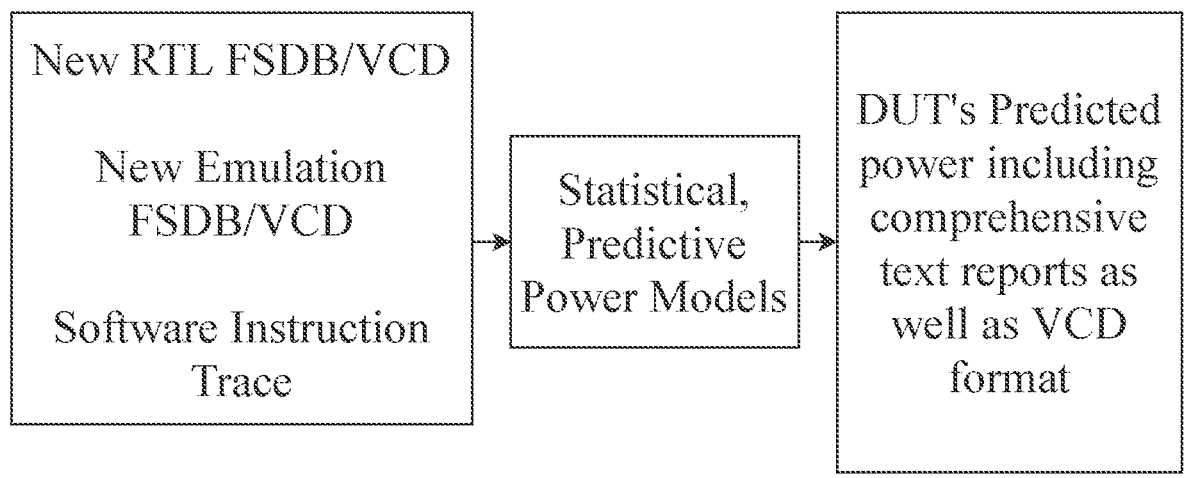
FIG. 5B representatively illustrates method and system elements for predicting and managing power and energy use in semiconductor devices.

FIG. 5B representatively illustrates the user of a power model. The models function like transaction level models (TLMs) for power, so they run much faster than existing solutions. The models run predictive power simulations by sampling new activity (such as register transfer level FSDB/VCD data, emulation FSDB/VCD data, or software instruction trace). The models can output the DUT's predicted power including comprehensive text reports (.TXT files) and VCD files.

The solution disclosed herein does some things that existing solutions do. For example, existing early RTL power tools and existing non-RTL power tools help with clock and power gating, as does the solution disclosed herein. The disclosed solution is portable to emulation environments, which is also a feature of existing early RTL and existing non-RTL power tools. There are several features of the disclosed solution, however, which do not exist in the existing early RTL and non-RTL products, such as: action power information in software/emulation; modeling the power cost of actions; power vs. performance analysis; power deviation analysis (to detect potential power bugs); and portability to both emulation platforms and software environments. In addition, the speed of the disclosed solution is substantially faster than existing software simulations and emulation platforms.

For example, in one benchmark test producing results on a 40 GB database, the predictive power simulation took 1/16 the time for a traditional power measurement tool. Accordingly, the disclosed solution has slightly less accuracy (95%) but has great reductions in time. Additionally, in the benchmark test the disclosed solution carried out what-if power exploration in less than one minute in most cases, and model training took thirty minutes.

Figure 6:
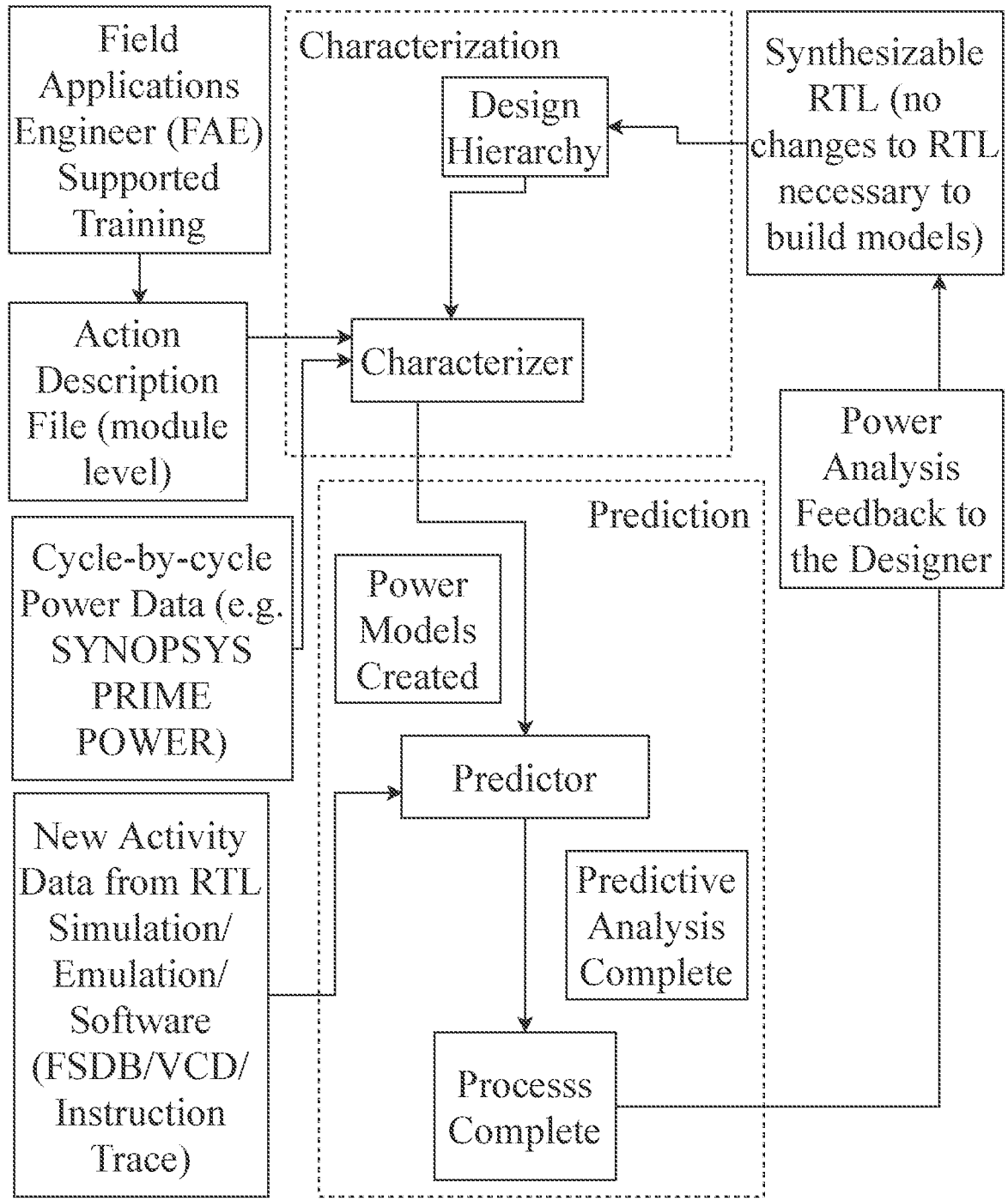
FIG. 6 representatively illustrates method and system elements for predicting and managing power and energy use in semiconductor devices.

FIG. 6 is a block diagram representatively illustrating a flowchart of some of the methods disclosed herein. Components such as the characterizer and predictor may be implemented using software and/or hardware elements. At the characterization step there may be standard deviation information feedback to gauge model quality. As discussed previously, the cycle-by-cycle power data may be provided by a third party tool such as SYNOPSYS PRIMEPOWER. Once the predictive analysis is complete for any given semiconductor device, many outputs and tools can be provided, such as: action-based power information (power cost of actions/functions); a list of the top power-consuming modules/instances/actions; a power deviation report for detection of potential power bugs; top power peaks with timing information; idle power, wasted power, clock and power gating opportunities (module level); prediction of power based on changing packet duration, spread, etc.; what-if analysis such as power vs. performance, worst case traffic, effects of changing voltage/frequency, and so forth.

FIG. 7 is a block diagram representatively illustrating elements/steps used to create an action description file (ADF), and FIG. 8 is a representative example of an ADF based on the FIG. 7 elements/steps. The ADF describes the functionality within the DUT, which in turn defines the power model behavior. The ADF is created by copying and pasting input interface signals of the DUT into a file, which is then used to create the ADF. The system/tool generated ADF may be manually modified at any point in time, if needed.

Figure 9:
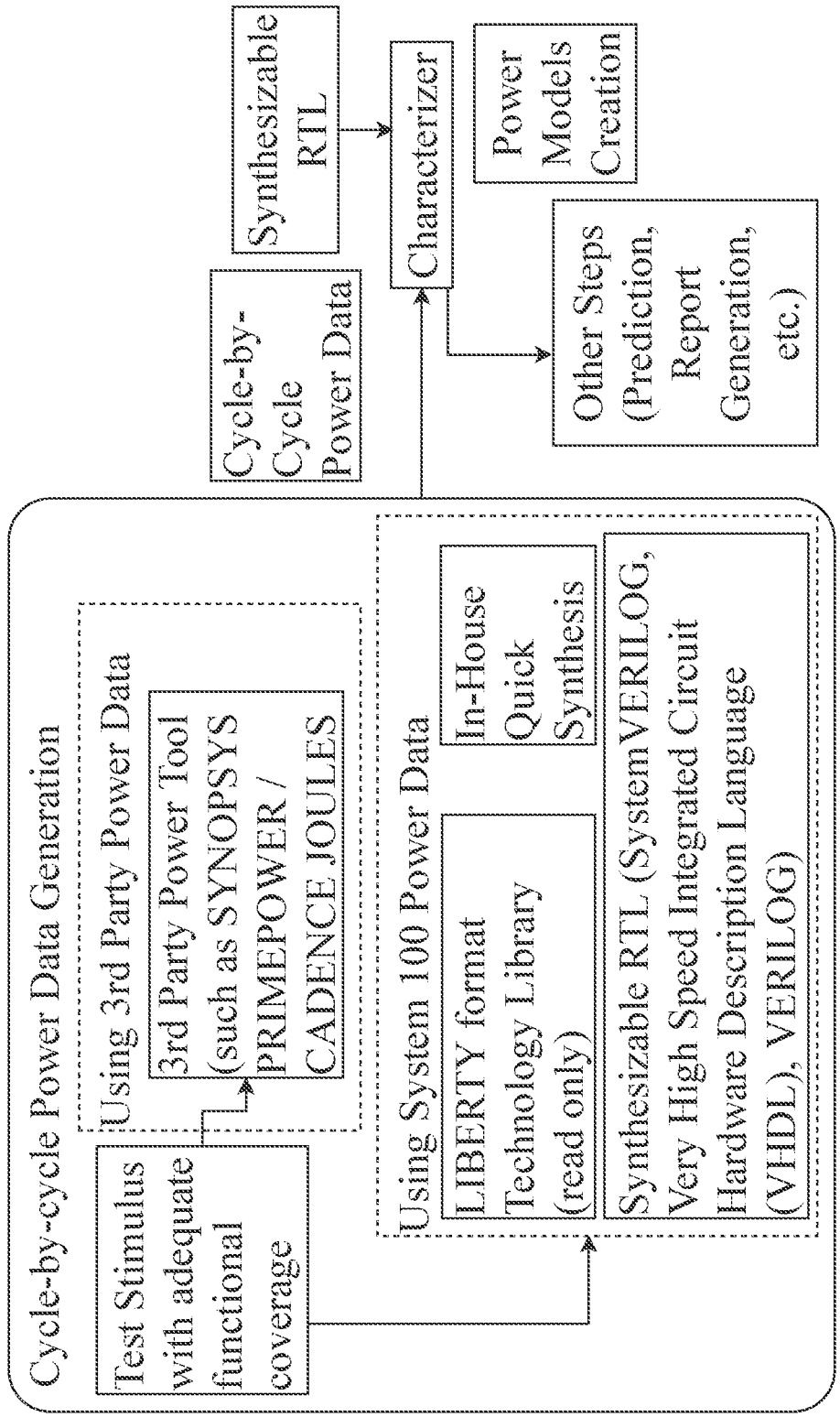
FIG. 9 representatively illustrates method and system elements for predicting and managing power and energy use in semiconductor devices.

FIG. 9 is a block diagram representatively illustrating elements of cycle-by-cycle power data generation. The cycle-by-cycle power data generation can be automated. Test stimulus with adequate functional coverage includes characterization tests. Characterization tests exercise the major functions of the design and are usually a subset of all tests available. Test stimulus is used in conjunction with either system 100 power data or with third party power data. The characterizer uses the cycle-by-cycle power data and the synthesizable RTL for power model creation. Other steps are later done, such as prediction, report generation, and so forth.

Figure 10:
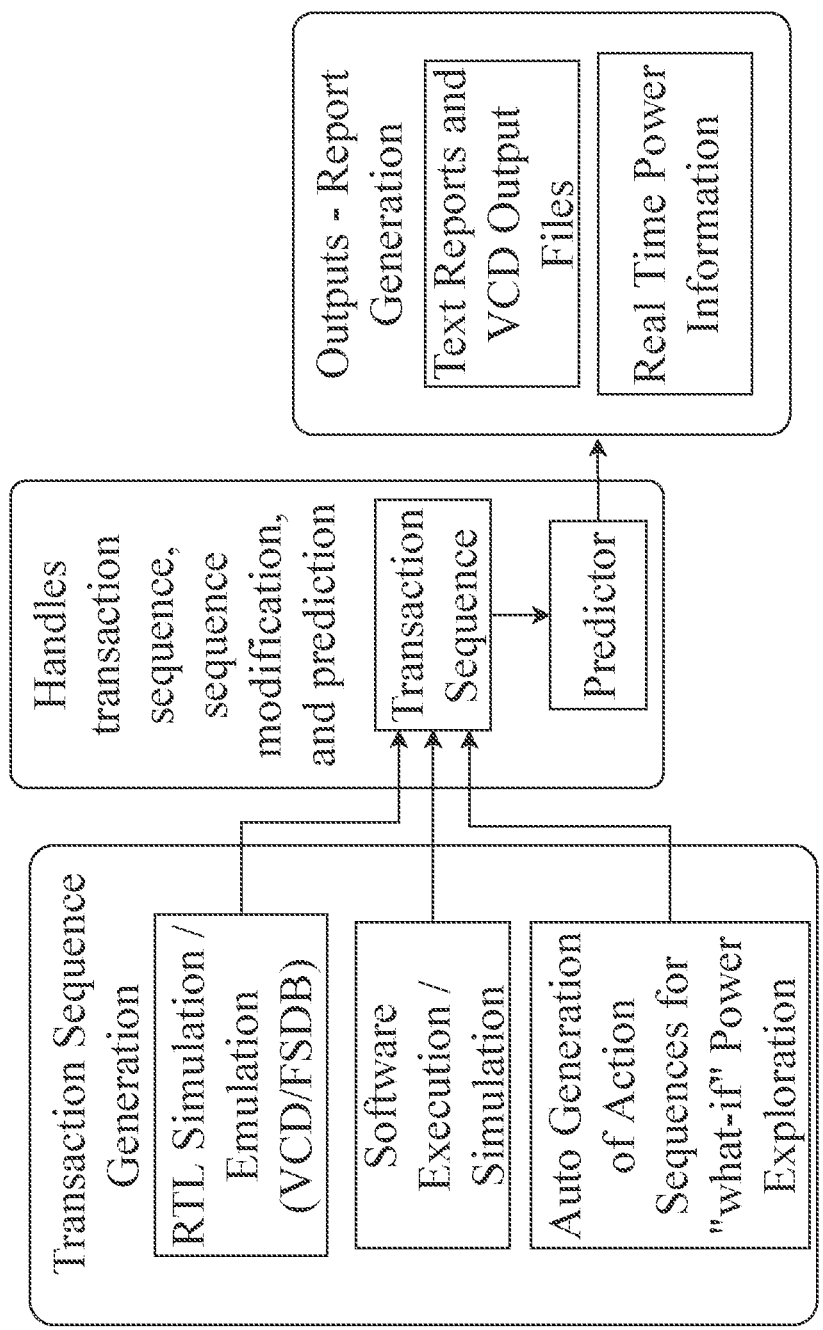
FIG. 10 representatively illustrates method and system elements for predicting and managing power and energy use in semiconductor devices.

FIG. 10 is a block diagram representatively illustrating portions of the methods. These methods work in simulation, emulation, and software environments. Running the models directly in software environments is useful to help smart, power-aware software. In implementations the systems and methods disclosed herein may be used to assist in integrated circuit design or semiconductor device design, by allowing the designer to see how power and actions are related. This allows the designer to make adjustments during the design stage to optimize the semiconductor device, taking into account tradeoffs, to achieve the desired result. The power model simulations may utilize probabilistic distributions of actions in auto-generated action sequences.

With regards to the "real time power information" of FIG. 10, as discussed above, the methods may be used herein at the semiconductor device level itself to inform power management of the semiconductor device after the device is already deployed. For example, real-time power information of the semiconductor device may be used by the semiconductor device itself (or a communicatively coupled module/device) to inform about power use, and this may be used in management of the semiconductor device. This allows the chip/IC to make real time adjustments based on real time modeling. As with other methods disclosed herein, such methods may be based on power modeling that associates the semiconductor device's power use with actions of the semiconductor device. This modeling allows for real-time adjustments to improve the performance, or operating life, or some other metric/feature of the semiconductor device. This allows for results such as longer life of the semiconductor device, decreased temperature, and so forth. In implementations the term "real time," as used herein, means information that is provided within a certain amount of time of the related action(s), for example power information provided within 1 microsecond of the related action(s).

FIG. 11 representatively illustrates elements of the system and methods disclosed herein. Various modules within a semiconductor device design are representatively illustrated, which could include functional code/logic and/or signal elements and/or the like. The double-arrowed lines between modules representatively illustrate communicative couplings between the modules and the circles thereon representatively illustrate actions. Power models may be used to rank the top power consuming activities/actions (power per transaction/action) (i.e., ranking the power cost of actions), to help identify wasted power (through data path vs. control path analysis), to provide clock/power gating opportunities (clock gating/power gating assistance) including idle power identification, and to rank to power-consuming modules or instances. The power models allow for deep insights into power consumption of the design. The model is built with a few tests and thereafter can predict power on all tests for a semiconductor design. The power model may report power deviation of actions/modules to pinpoint potential power bugs.

Figure 12:
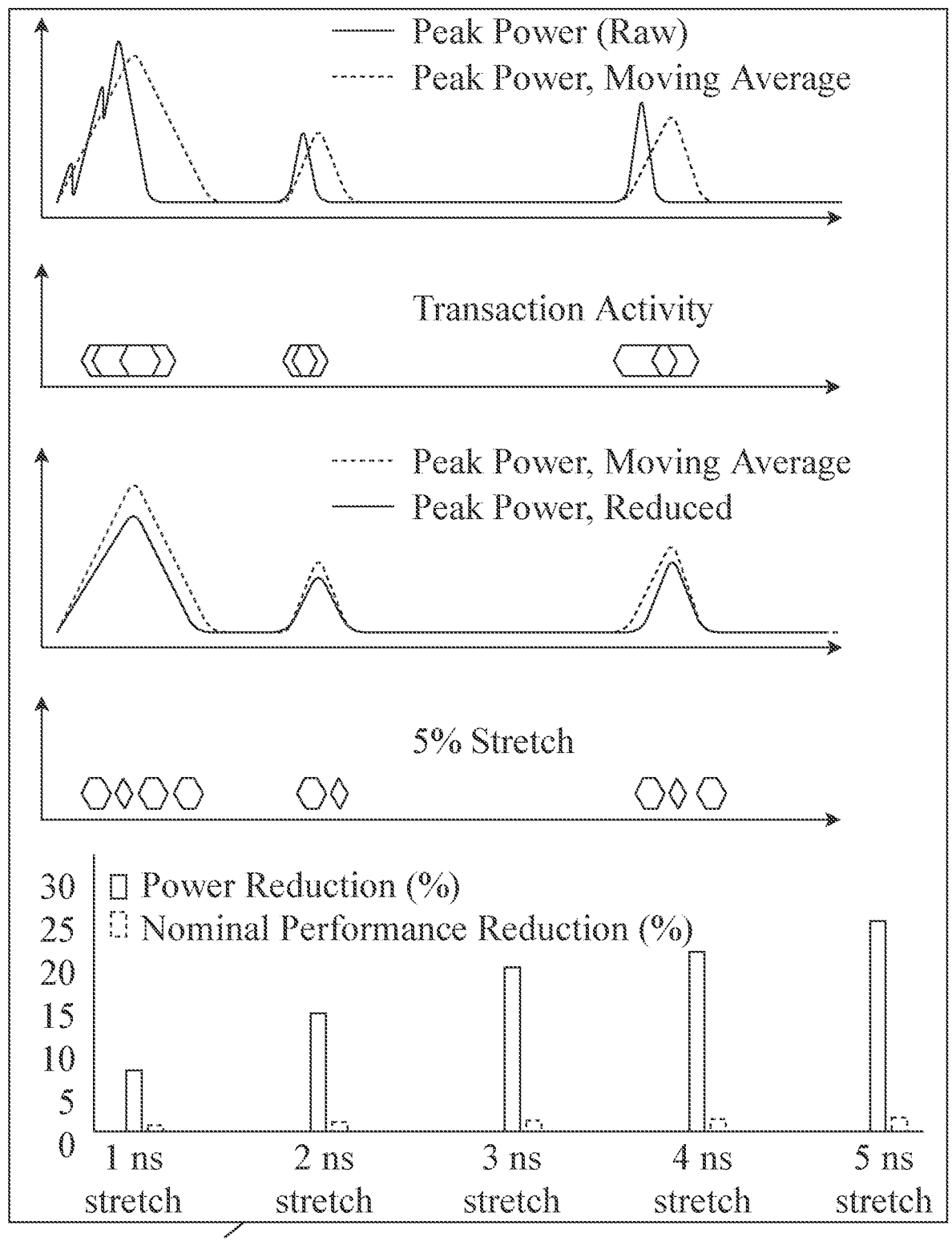
FIG. 12 representatively illustrates an example user interface of a system for predicting and managing power and energy use in semiconductor devices.

FIG. 12 representatively illustrates how the system and methods disclosed herein can assist with power vs. performance analysis. The elements disclosed in FIG. 12 may be shown on an interface 1200 to the user to assist with the analysis. The models have traffic-shaping capability so the user can see the effect of spreading peak activity to reduce peak power. For example, the uppermost graph plots peak power (raw) and peak power (moving average) over time. The graph below this representatively illustrates transaction (or action) activity, to the user can see actions that are correlated with the power peaks. The next two graphs below this representatively illustrate the effect of a 5% stretch in the actions, how this reduces the peak power (lower than the moving average of the top graph). The lower most graph representatively illustrates how stretches of different amounts of time for the actions (1 ns to 5 ns) affects power reduction and nominal performance reduction. The power vs. performance tradeoff plots are generated by the model predictions/analysis. Such graphs/plots allow for the comparison of different architectures (or RTL implementations) for power and performance. The user can simulate the typical/worst case traffic conditions/power analysis, probabilistic action distribution power analysis, effects of cache hits/misses, and so forth. The power model generally generates the power vs. performance analyses such as those shown on interface 1200 in under one minute.

Figure 13:
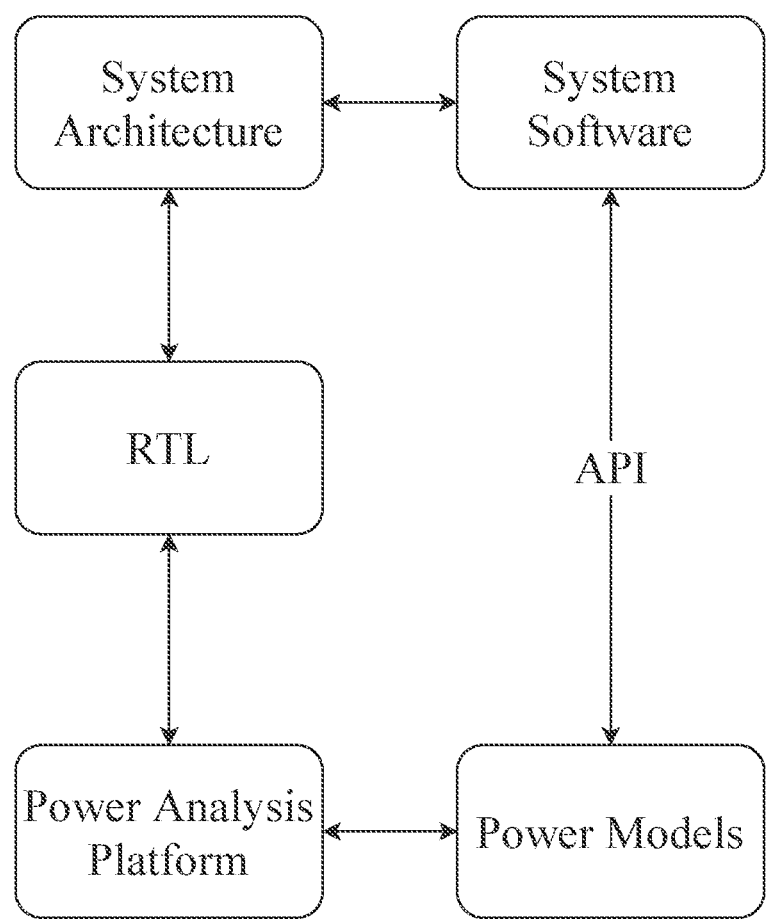
FIG. 13 representatively illustrates method and system elements for predicting and managing power and energy use in semiconductor devices.

FIG. 13 representatively illustrates other features of the systems/methods disclosed herein, including integration with a user's system software. The predictive power models are versatile and may be plug-and-play with a user's tool chain and system software. The methods enable a closed-loop system integrating system architecture, software and RTL. The methods and power models allow the user to implement power optimization techniques to optimize overall system power.

TABLE 6 illustrates an example action prediction report produced by a power model using in-house cycle-by-cycle power data. The "count" column gives the number of actions found. The "active ps" column gives the average duration of the action in picoseconds. The "active uW" column gives the average power of the action, in microwatts, when an action was active. The "overall uW" column gives the overall power of the action for the entire simulation. In some implementations the report will also include a "captured value" column. It is not applicable in this report, but for example the power models can capture and report a useful value per action—for example an operand. The "name" column gives the auto-generated name of an action.

TABLE 6

Action Prediction Report

| count | active ps | active uW | overall uW | name |
|---|---|---|---|---|
| 79951 | 900 | 76265 | 76218 | ..._...req/... wr/eof__asserted |
| 78380 | 900 | 50408 | 49387 | ..._-cache/idle |
| 13593 | 900 | 61641 | 10473 | ..._te/..._-eof__asserted |
| 73554 | 900 | 8688 | 7987 | ..._..._axi4_.../idle/item |
| 75279 | 900 | 7888 | 7422 | ..._..._out/..._ready__asserted |
| 66526 | 900 | 4375 | 3638 | ..._..._ld/..._flush__asserted |
| 64041 | 900 | 2395 | 1917 | ..._..._buf/idle |
| 63655 | 900 | 2223 | 1768 | ..._..._axi/idle |
| 66404 | 900 | 1712 | 1421 | ..._..._..._wr/idle/item |
| 57622 | 900 | 1906 | 1372 | ..._..._alu/ex_..._asserted |
| 1620 | 900 | 55329 | 1120 | ..._-cache/rvalid__asserted |
| 70851 | 900 | 1150 | 1018 | ..._..._branch/idle |
| 46133 | 900 | 1385 | 799 | ..._..._if/..._asserted |
| 618 | 900 | 87764 | 677 | ..._te/..._eof_vld__asserted |

TABLE 7 illustrates actual (not predicted) actions and power measured and reported by a leading third party power tool. The columns include the same types of information described above for TABLE 6.

TABLE 7

Action Prediction Report

| count | active ps | active uW | overall uW | name |
|---|---|---|---|---|
| 79951 | 900 | 76265 | 76218 | ..._...req/... wr/eof__asserted |
| 78380 | 900 | 50408 | 49387 | ..._-cache/idle |
| 13593 | 900 | 61641 | 10473 | ..._te/..._-eof__asserted |
| 73554 | 900 | 8688 | 7987 | ..._..._axi4_.../idle/item |
| 75279 | 900 | 7888 | 7422 | ..._..._out/..._ready__asserted |
| 66526 | 900 | 4375 | 3638 | ..._..._ld/..._flush__asserted |
| 64041 | 900 | 2395 | 1917 | ..._..._buf/idle |
| 63655 | 900 | 2223 | 1768 | ..._..._axi/idle |
| 66404 | 900 | 1712 | 1421 | ..._..._..._wr/idle/item |
| 57622 | 900 | 1906 | 1372 | ..._..._alu/ex_..._asserted |
| 1620 | 900 | 55329 | 1120 | ..._-cache/rvalid__asserted |
| 70851 | 900 | 1150 | 1018 | ..._..._branch/idle |
| 46133 | 900 | 1385 | 799 | ..._..._if/..._asserted |
| 618 | 900 | 87764 | 677 | ..._te/..._eof_vld__asserted |

TABLE 8 includes two columns. The Δ Active Power (%) column gives the percentage difference between the actual (calculated by a leading third party power tool) and predicted (by the power model) active power. The Δ Overall Power (%) column gives the percentage difference between the actual (calculated by a leading third party power tool) and predicted (by the power model) overall power. The prediction is seen to be over 96%-99% accurate in most cases, predicting within 96%-99% accuracy the actual active power and overall power.

TABLE 8

Percentage Differences Between TABLES 6 and 7

| Δ Active Power (%) | Δ Overall Power (%) |
|---|---|
| 0.215503081 | 0.213000947 |
| −2.444311122 | −2.443505057 |

TABLE 8-continued

Percentage Differences Between TABLES 6 and 7

| Δ Active Power (%) | Δ Overall Power (%) |
|---|---|
| −3.783657223 | −3.785025264 |
| 0.392881904 | 0.377026518 |
| 1.076371092 | 1.075854555 |
| 0.321027287 | 0.303280948 |
| 0.0835771 | 0.104438642 |
| 0.0450045 | 0 |
| 0.234192037 | 0.211565585 |
| −0.209424084 | −0.218181818 |
| 0.311837119 | 0.358422939 |
| 0.087032202 | 0.098328417 |
| 0.2170767 | 0.250941029 |
| 2.196138708 | 2.111613876 |

FIG. 14 representatively illustrates a prediction run of system 100 done for an actual customer. A prediction run was also done using a leading third party power tool. The power model run took about 29 minutes, while the leading third party power tool run took about 12-13 hours. The power model accordingly reflected an over twenty times improvement in speed for an RTL simulation.

In other tests for an artificial intelligence (AI) system on a chip (SoC), a power model was used to predict power use and actual power was measured using PRIMETIME PX (PTPX). The peak-to-valley durations of the predictions aligned with the PTPX actual power. The prediction predicted 331.3 mW compared to an actual measured 320.4 mW, and the prediction predicated about 607 ns compared with an actual measured about 601 ns. The predicted power peaks also aligned temporally with measured RTL signal activity/behavior.

The data output from the power model may be used in various third-party display/graphing/plotting software to view the results in a visual/graphical format (for example seeing a predicted power waveform or the like). This may be useful to compare predicted power waveforms with actual measured power waveforms and the like.

To recap, the above-disclosed systems and methods for predicting power and energy use of semiconductor devices include various advantages. The power models based on actions allow for fast and accurate predictive power simulations—including model simulations which run twenty to three-hundred times faster than gate simulations. The power models provide intelligence unavailable with any other solution, including estimating the power cost of actions, power vs. performance analysis, and power deviation analysis to find power bugs earlier. The what-if power exploration is very fast (under a minute in most cases), allowing the power models to be used to explore power vs performance scenarios, reduce peak power, compare power consumption of multiple architectures, and so forth. The methods allow detailed power visibility as software runs—this unique capability enables smarter, power-aware software and hardware development. The power models facilitate ultra-fast predictive power exploration by using power model simulation (peak power reduction, traffic shaping, effects of architecture and software changes, etc.). The power models are highly accurate-95%-97% as accurate as gate simulations and actual power measurements. The power model methods and system work with all leading electronic design automation (EDA) tools and can be easily integrated into existing workflows. Additionally, the power models can be run on a simulator, on an emulator, or inside a software development environment. The power models may be used by system architects, engineers and technical managers, by semiconductor companies, and so forth. The power model methods may improve power use, life, and so forth of various products which incorporate semiconductor devices, regardless of scale or size of the products. The power models add intelligence to power analysis—existing tools simply measure power, but the power models can estimate the power cost of actions (such as CPU opcodes, memory transfers, software subroutines, etc.). The power models provide accurate and detailed power information.

Figure 15:
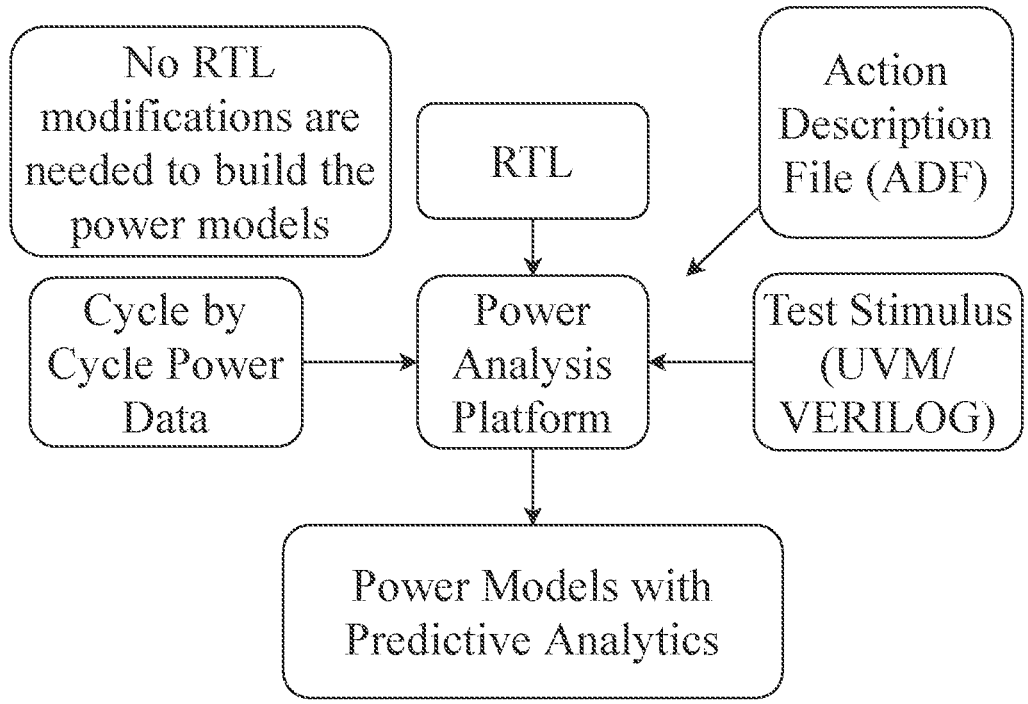
FIG. 15 representatively illustrates method and system elements for predicting and managing power and energy use in semiconductor devices.

FIG. 15 representatively illustrates methods related to power modeling. As indicated above, models are generated from cycle-by-cycle power data, such as from third party tools (like SYNOPSYS PTPX) or u sing data generated by a software application of system 100. The ADF is used to describe major actions of the DUT (this can be built by a software application of system 100). A few test cases can be used to exercise the actions. The modeling shown in FIG. 16 utilizes RTL data. A power analysis platform can be used to analyze data and/or prepare the models and/or to view modeled data, and can include one or more user interfaces. In implementations the models are statistical in nature and are self-monitoring for accuracy. The power models may include predictive analytics. The power models may be built at any level, such as a small block or an entire application specific integrated circuit (ASIC). As described above, the models allow for fast, predictive power simulations and enable system power exploration at 200 times or more the speed of gate simulations.

Figure 16:
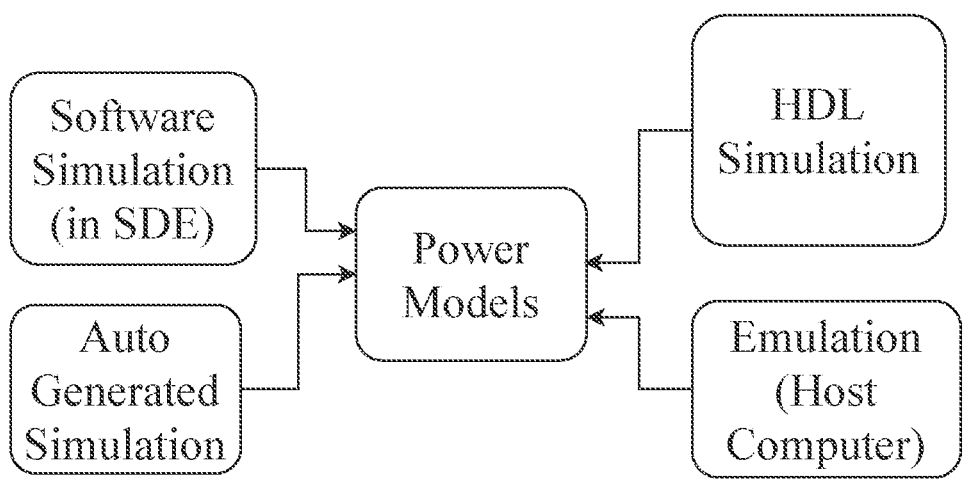
FIG. 16 representatively illustrates method and system elements for predicting and managing power and energy use in semiconductor devices.

FIG. 16 representatively illustrates methods related to power modeling. The power modeling allows for fast power exploration on any platform. The power models run fast, prediction-based power simulations. This allows the user to forego time-consuming gate simulations for power analysis of semiconductor devices. The power models may be used across the board using various platforms: HDL simulators; emulation platforms (on host computer); software development environments (SDEs); or auto-generated action sequence simulations. The power models allow for "what-if" power exploration with traffic shaping. They also allow for fast change analysis to quickly analyze power changes from changes to software, architecture or design. They allow for power vs. performance analysis, and allow typical/worst-case operating condition analysis.

Figure 17:
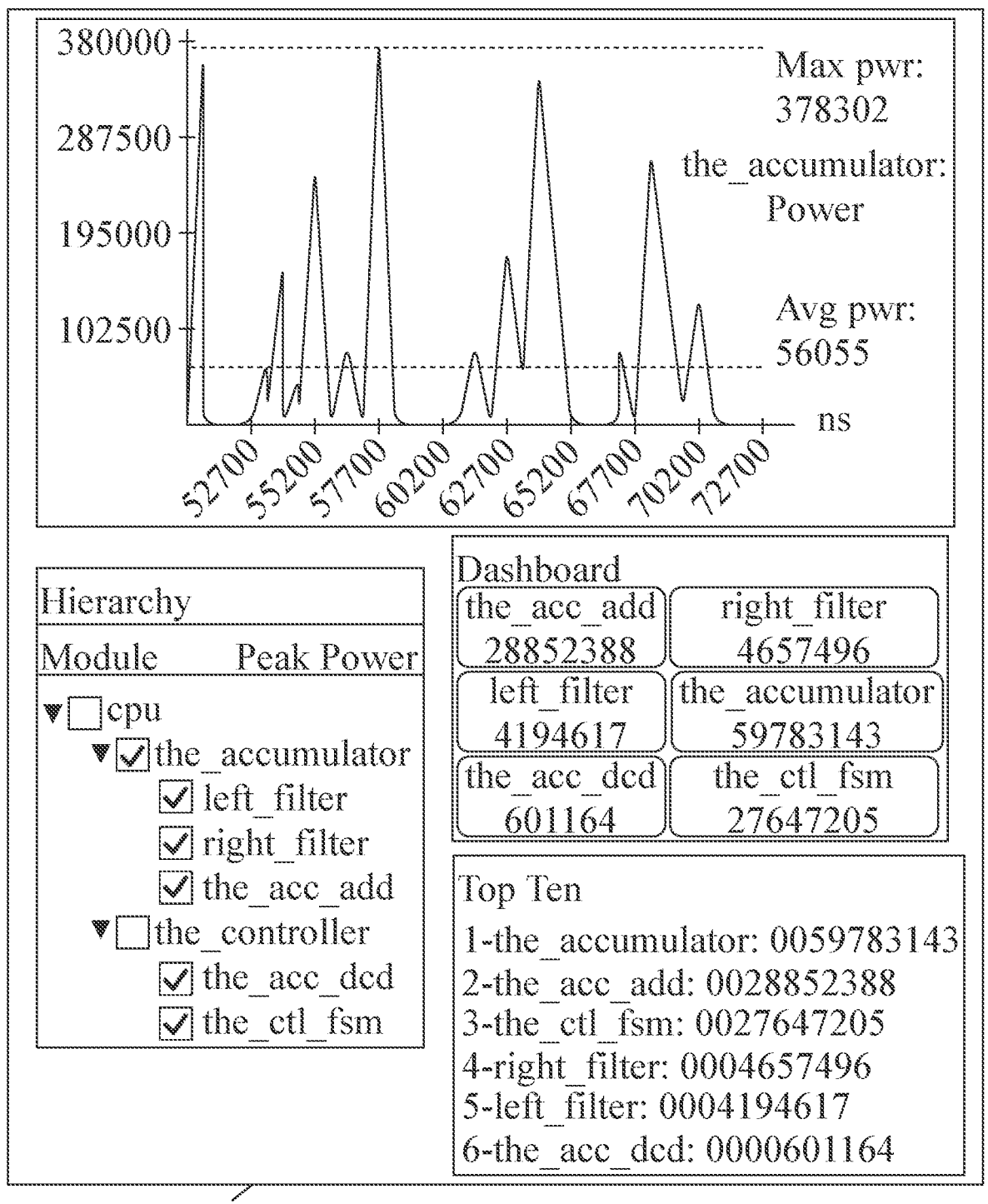
FIG. 17 representatively illustrates an example user interface of a system for predicting and managing power and energy use in semiconductor devices.

FIG. 17 representatively illustrates an example user interface 1700 that a user may use in conjunction with the power modeling methods. Additional user interfaces may be shown to the user, such as those showing other power vs. time plots, and the like, for different components/modules of a semiconductor device and/or for different actions. Interface 1700 allows the user to view power vs. time plots for different modules/submodules. In the example shown the interfaces shows a power vs. time plot for the "the_accumulator" component. The plot of power vs. time (in nanoseconds) is shown, including a line and value showing maximum power and a line and value showing average power. From the Hierarchy menu the user can select modules/submodules to view, and the Dashboard may then show the power use of those modules/submodules, while the Top Ten list may show the top ten power using modules/submodules of those that are selected in the Hierarchy list, organized by most-to-least power consuming. In implementations a user may be able to select any of the modules/submodules shown in the Dashboard section to view the power vs. time plot for that module/submodule. Interface 1700 allows the user to easily view power characteristics such as which modules/submodules are using the most power, how much each is using, etc.

Interface 1700 may be viewable using a user interface provided by software of system 100, but in implementations a user may use third-party software to view various elements such as those shown in interface 1700, with the interface using any of the system-output reports (such as text or VCD files) to display the details.

Figure 18:
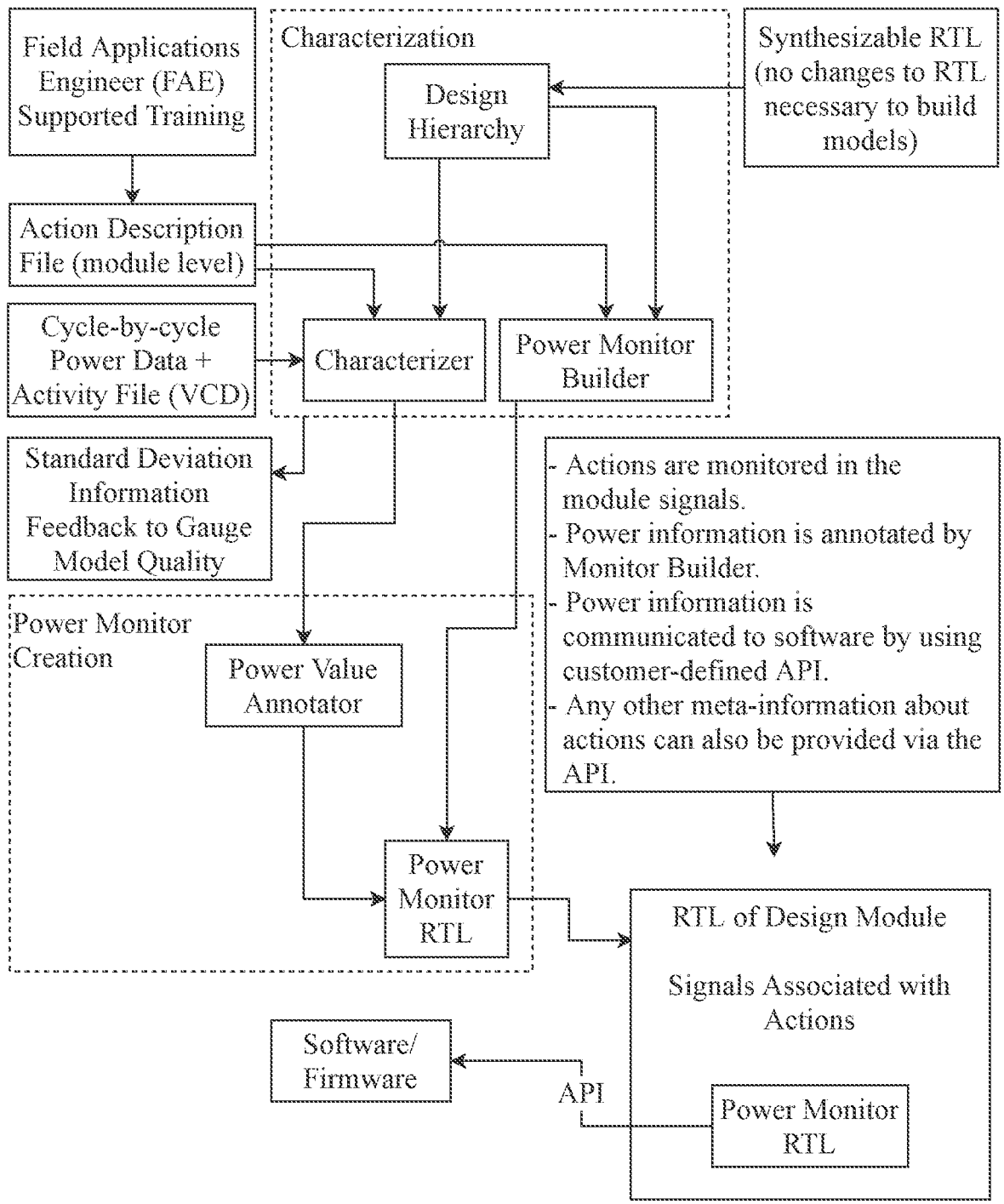
FIG. 18 representatively illustrates method and system elements for predicting and managing power and energy use in semiconductor devices.

FIG. 18 representatively illustrates elements of implementations of power/energy model methods, described below:

1. System 100 may include one or more software elements or tools to read in the user's RTL code of the design module to determine the design hierarchy (identifying design modules, their connections, etc.).
2. An action description file (ADF) is created by the user specifying various signals signifying actions within the design.
3. The design hierarchy module reads in the ADF, combining that with the design hierarchy information from step 1 above, and identifies the actions specified in the ADF.
4. The identified action information is fed to the Power Monitor Builder module, which creates the RTL for the Power Monitor (Power Monitor RTL).
5. The Characterizer takes in the identified action information from step 3, an activity file (such as a VCD file) and cycle-by-cycle power information to annotate power information in the Power Monitor RTL. In implementations the VCD can be created by any commercial design simulation tool. In implementations the cycle-by-cycle power data may be created by a software or tool of system 100, or optionally by another commercial power analysis tool.
6. The Power Monitor RTL with the annotated power values is included in the design module RTL.
7. A hardware communication protocol also known as an API (Application Programming Interface) defined by the user is used by the Power Monitor RTL to communicate the action-power information to the user's software/firmware. This information is provided in real time to the software/firmware, as discussed earlier with regards to FIG. 10.

As can be seen, the power analysis is enabled by fast, predictive power models. Analysis may be done using intuitive general user interfaces (GUIs). The methods may allow easy integration with tool chain and other system software. The system and methods may allow an immediate return on investment with early energy data.

Reference is now made to FIG. 19, which representatively illustrates example elements of implementations of power/energy model methods. A high-level process may include three steps: power measurement, power modeling/characterization, and power forecasting/predicting. In implementations the input to power measurement may include RTL and a test. The output may include a signal activity waveform, a cycle-by-cycle hierarchical power data, and reports. The input to power modeling may include the output of the measurement step and, additionally, the action descriptions. The output of power modeling may include power models and reports. The input to the power forecasting may include the power models, the action descriptions, and a second test. The output of the power forecasting may include a set of reports. Each and every report could result in the designer changing the RTL and/or the tests.

One can create an action stream from a new RTL VCD/FSDB, from an emulation VCD/FSDB, from a software instruction trace, from a random action generator constrained by choice parameters, and direct from a high-level. An action stream and the power models are input to the Power Predictor. The output of the Power Predictor is one or more of textual report, power waveforms, and action waveforms.

FIG. 6 can be seen as a somewhat more detailed version of FIG. 19 (in particular incorporating a designer in the loop). There may be two tests. The first test (Test1 of FIG. 19) may feed into a power measurement block. The measurement box of FIG. 19 may produce the "cycle-by-cycle" power data of FIG. 6. The second test (Test2 of FIG. 19) feeds into a simulation that produces the "New Activity Data" of FIG. 6. The "Power Analysis Feedback" of FIG. 6 closes the loop by feeding into the two tests.

Any of the signals described herein may be control logic signals or any other type of signals. As described to some extent above, the methods herein may include computing a value from an expression over other values. Some of these may be done in the moment, for example: an operation of the expression including a hardware description language operation; or an operation of the expression including a population count of the signals. Some may act more like a memory, for example: operations of the expression including an association of one value with another and using the association later to recognize an integrated circuit action.

In implementations a system-recognized stream of actions may come from a prior recognition of a stream of logic signals (this invention enables layers of modeling where the higher-level layers can be built without a monolithic gate-level implementation for the higher levels).

In implementations the energy/power of an action may be computed from a circuit design specification (i.e., provided by a circuit designer, including signal descriptions). The circuit description could, for example, be written in VERILOG, SYSTEMVERILOG or other HDL and read by the system tools/software and interpreted to determine the energy/power per action.

In implementations methods of energy/power modeling include using one or more processors to providing one or more metrics related to a quality of the power estimation. This can include providing metrics such as standard deviation, confidence intervals, and so forth, as described to some extent above, so a user can determine whether a model is accurate/reliable or not.

The systems and methods may include generating/characterizing two independent energy and/or power models simultaneously from a single stream of signals. The integrated circuit may be independently doing two or more things, for example, and there may be different ways to model the two or more things, so that they can each be modeled simultaneously.

In implementations power models may be configured so that a stream of actions has a representation that is independent of the recognition or production of that action (for example, simulating actions independent of signals).

During simulation/emulation of a semiconductor device, a stream of actions may be randomly produced per user specification. For example, a user may desire to model a 10% failure rate, and assign the failure rate randomly to any component, process, or the like. In such implementations a randomizer may be used to randomize one or more aspects of the simulation/emulation.

The power models disclosed herein may model semiconductor device power/energy use using fewer logic signals than present in the entire semiconductor device/circuit (because representing higher level actions instead of modeling individual gate activity). This enables faster, more efficient power analysis compared to other solutions that use all of the signals in the circuit.

When using power models for prediction, the energy/power of any given action may be manually modified before use in prediction. This modification may enable prediction with different circuit parameters (for example changing the voltage of a chip from what was used in the original simulation or model). An action sequence (for example a stream of integrated circuit actions recognized from a signal activity stream of a simulation/emulation) may also be modified before use in prediction. This modification enables evaluating possible circuit changes, architecture changes, or software changes before their implementation. For example, the use could remove some actions, decrease the number of actions, move actions around, place new actions in, and so forth—varying the actions in any way desired to test the effect on power use and/or energy use. Allowing modification of the action sequence in this way may enable software optimization for power consumption. The software may be able to experiment with different action configurations by taking one or more actions out, putting one or more actions back in, adding one or more new actions, rearranging actions, delaying an action, causing an action to occur sooner, inserting a pause between actions, and so forth, to see if any given change will improve power/energy use or make it worse, and accordingly optimize power/energy use by modifying actions.

In implementations the recognition of actions is based on signals, not the values. The values enable the splitting of a single action into multiple distinct actions sharing a common type. In other words, there is recognition of actions, and there is also refining or factoring of actions.

The prediction process may be implemented in hardware, for example on a chip directly, using finite state machines to represent actions, taking the FSM represented actions and generating hardware, and so forth.

The output of a model may be used to modify power/energy use of a semiconductor device. This includes both modifying actions and the like of an existing semiconductor device to modify power/energy use, as well as changing the design of a to-be-fabricated semiconductor device such that its power/energy use will be modified. The medication may, of course, entail reducing the power and energy use.

Any of the modules, blocks, etc. of any of the figures may be implemented using computer code, software, hardware, firmware, and so forth, or a combination thereof. Any of the elements shown in any of the figures may be shown on/in user interfaces of system 100.

The systems and methods disclosed herein improve the functioning of a computer directly (and improve the functioning of semiconductor devices directly) by allowing the designer to reduce power usage before the device is built and/or by allowing the device itself to reduce power usage in-situ, based on very fast power modeling. This increases the life, reduces the likelihood of failure and/or reduces failure modes, improves the efficiency, and otherwise improves the functioning of a computer and/or semiconductor device directly.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of systems and methods for predicting power and energy use of semiconductor devices, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited in the claim, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element.

What is claimed is:

1. A method for modeling one of energy use and power use of actions of a semiconductor device and reducing one of energy use and power use of the semiconductor device, comprising:
   receiving, at one or more processors, an output from a simulation of a semiconductor device; and
   using the one or more processors:
      recognizing, from the output, a plurality of integrated circuit actions;
      determining one of an energy use and a power use associated with each integrated circuit action;
      generating a first model of one of energy use and power use for the semiconductor device, the first model based at least in part on the recognized integrated circuit actions and the determined one of energy use and power use associated with each integrated circuit action;
      generating a second model of one of energy use and power use for the semiconductor device, the second model based at least in part on the recognized integrated circuit actions and the determined one of energy use and power use associated with each integrated circuit action;
      merging the first model and the second model to form a third model of one of energy use and power use for the semiconductor device; and
      based on an output of the third model, reducing one of energy use and power use of the semiconductor device;
   wherein the one or more processors generate the first model and the second model simultaneously based on a single stream of signals from the simulation of the semiconductor device.

2. The method of claim 1, wherein the determined one of energy use and power use associated with each integrated circuit action is determined based on one of: a manual user input; a computation performed by the one or more processors based at least in part on a design specification file associated with the semiconductor device; and a statistical prediction.

3. The method of claim 1, further comprising providing, using the one or more processors, one or more metrics to evaluate a quality of one of the first model, the second model, and the third model.

4. The method of claim 1, wherein one of the first model, the second model, and the third model models an integrated circuit action as comprising multiple sub-actions, occurring at different points in time, each having an associated one of energy use and power use at the respective point in time.

5. A method for predicting and reducing one of energy use and power use of actions of a semiconductor device, comprising:
   receiving, at one or more processors, an action stream associated with a semiconductor device, the action stream comprising a stream of integrated circuit actions, wherein each integrated circuit action represents an abstraction of work done by the semiconductor device, and wherein the stream of integrated circuit actions represents multiple consecutive integrated circuit actions with no gaps between them;
   generating, using the one or more processors, one or more models of one of power use and energy use for the semiconductor device, the one or more models based at least in part on the stream of integrated circuit actions; and
   using the one or more models and the one or more processors:
      determining one of power use and energy use for each integrated circuit action in the action stream; and
      predicting one of energy use and power use of the semiconductor device; and
   reducing one of power use and energy use of the semiconductor device based at least in part on predicting one of power use and energy use of the semiconductor device.

6. The method of claim 5, wherein the action stream is at least partially recognized from signal activity of a logic-level simulation of the semiconductor device, wherein the logic-level simulation comprises one of a hardware description language (HDL) simulation, and a transistor gate level simulation.

7. The method of claim 6, wherein the one or more models uses fewer logic signals than present in the entire semiconductor device, or fewer logic signals than present in the logic-level simulation of the semiconductor device, to predict one of energy use and power use of the semiconductor device.

8. The method of claim 6, wherein all of the method steps are performed in the same semiconductor device that is the basis of the simulation.

9. The method of claim 5, wherein the action stream is at least partially generated by a software simulation without reference to actual logic signals of the semiconductor device and without reference to simulated logic signals of the semiconductor device.

10. The method of claim 5, wherein the action stream is at least partially randomly generated.

11. The method of claim 5, further comprising modifying the stream of integrated circuit actions before predicting one of energy use and power use of the semiconductor device, the modification comprising one of: adding one or more additional integrated circuit actions; rearranging the integrated circuit actions; delaying one or more of the integrated circuit actions; and causing one or more of the integrated circuit actions to occur sooner.

12. The method of claim 11, further comprising optimizing the semiconductor device for power consumption using automated software modification of the stream of integrated circuit actions.

13. The method of claim 5, further comprising modifying a determined one of power use and energy use for an integrated circuit action before predicting one of energy use and power use of the semiconductor device.

* * * * *